(12) United States Patent
Sugita et al.

(10) Patent No.: US 9,742,258 B2
(45) Date of Patent: Aug. 22, 2017

(54) ROTATIONAL-LINEAR MOTION CONVERTER

(71) Applicant: SANYO DENKI CO., LTD., Tokyo (JP)

(72) Inventors: Satoshi Sugita, Tokyo (JP); Yuqi Tang, Tokyo (JP); Yasushi Misawa, Tokyo (JP); Shigenori Miyairi, Tokyo (JP)

(73) Assignee: SANYO DENKI CO., LTD, Tokyo (JP)

( * ) Notice: Subject to any disclaimer, the term of this patent is extended or adjusted under 35 U.S.C. 154(b) by 718 days.

(21) Appl. No.: 14/242,194

(22) Filed: Apr. 1, 2014

(65) Prior Publication Data
US 2014/0292126 A1 Oct. 2, 2014

(30) Foreign Application Priority Data

Apr. 2, 2013 (JP) .................................. 2013-076905

(51) Int. Cl.
*H02K 49/10* (2006.01)
*H02K 7/06* (2006.01)
(Continued)

(52) U.S. Cl.
CPC .............. *H02K 49/10* (2013.01); *H02K 7/06* (2013.01); *H02K 41/02* (2013.01); *H02K 41/031* (2013.01)

(58) Field of Classification Search
CPC ........ H02K 7/06; H02K 41/02; H02K 41/025; H02K 41/03
(Continued)

(56) References Cited

U.S. PATENT DOCUMENTS 4,908,533 A * 3/1990 Karita .................... H02K 41/03
310/12.18
6,674,186 B2 * 1/2004 Yajima .................... H02K 41/03
310/12.17
(Continued)

FOREIGN PATENT DOCUMENTS

DE 742362 C 12/1943
DE 3317813 A1 1/1984
(Continued)

OTHER PUBLICATIONS

Machine translation of JP2007215264A.*
European Search Report dated Mar. 31, 2017 issued in corresponding European Patent Application No. 14163217.4.

*Primary Examiner* — John K Kim
*Assistant Examiner* — Minki Chang
(74) *Attorney, Agent, or Firm* — Polsinelli PC

(57) ABSTRACT

A rotational-linear motion converter includes a cylindrical magnet rotor, a linear rail, a teeth row, and a magnet row. The magnet rotor includes a magnet row magnetized in a radial direction of the magnet rotor. The rail includes a plurality of projecting portions and recessed portions. The teeth row includes teeth and allows a magnetic flux flowing from the magnet row of the magnet rotor to pass between the magnet rotor and the rail. The magnet row includes magnets and is magnetized in an extending direction of the rail in order to align the magnetic flux flowing from the magnet row of the magnet rotor toward the projecting portions and the recessed portions of the rail. In the magnet row magnetized in the extending direction of the rail, the same polarity faces of adjacent magnets oppose each other in the extending direction of the rail.

15 Claims, 15 Drawing Sheets

(51) Int. Cl.
 *H02K 41/02* (2006.01)
 *H02K 41/03* (2006.01)
(58) Field of Classification Search
 USPC .......................... 310/12.01, 12.13, 12.14, 80
 See application file for complete search history.

(56) References Cited

U.S. PATENT DOCUMENTS

| | | | |
|---|---|---|---|
| 7,965,010 B2 * | 6/2011 | Froeschle | H02K 41/031 310/12.25 |
| 2013/0076159 A1 * | 3/2013 | Chung | H02K 21/16 310/12.18 |

FOREIGN PATENT DOCUMENTS

| | | | | |
|---|---|---|---|---|
| JP | S57-195959 | A | | 12/1982 |
| JP | 2007215264 | A | * | 8/2007 |
| JP | 2007215264 | A | | 8/2007 |
| JP | 2008215429 | A | | 9/2008 |

* cited by examiner

ROTATIONAL-LINEAR MOTION CONVERTER

CROSS-REFERENCE TO RELATED APPLICATION

This application claims priority to Japanese Application No. 2013-076905, filed Apr. 2, 2013, the entirety of which is incorporated herein by reference.

BACKGROUND

1. Technical Field

The present invention relates to a rotational-linear motion converter utilizing magnetism.

2. Description of Related Art

Hitherto, as a typical rotational-linear motion converter, a device to which a so-called ball screw mechanism is applied is used. In this type of rotational-linear motion converter, since friction is generated between a ball and thread grooves, it is likely that noise or vibration will occur, thereby making it difficult to enhance the longevity of such a converter. Additionally, in this type of rotational-linear motion converter, regular maintenance, such as greasing, is required for reducing the occurrence of noise or vibration caused by aging or for minimizing the wear of a ball. In this manner, the possibility of scattering of grease or the maintenance has to be considered, and thus, installation places of this type of rotational-linear motion converter are restricted, thereby decreasing the design flexibility.

These days, attention is being focused on technologies concerning, for example, non-contact rotational-linear motion converters utilizing magnetism, which may overcome the above-described drawbacks unique to a rotational-linear motion converter using a ball screw mechanism.

Japanese Unexamined Patent Application Publication No. 2008-215429 discloses a magnetic power transmission device which includes a non-contact magnetic rack and pinion mechanism and which converts rotational motion to linear motion. This magnetic rack and pinion mechanism includes a shaft-like member and a pair of support plates. The shaft-like member has permanent magnets which are spirally formed on the outer peripheral surface of the shaft-like member with predetermined pitches. The pair of support plates has permanent magnets on the internal surfaces thereof with the same pitches as those of the permanent magnets of the shaft-like member so that these permanent magnets may oppose the permanent magnets of the shaft-like member. In this magnetic rack and pinion mechanism, due to a magnetic attractive force generated between the permanent magnets of the shaft-like member and the permanent magnets of the support plates which oppose each other, rotational motion of the shaft-like member is converted into linear motion of the support plates. The strength of the magnetic attractive force differs depending on the number of opposing permanent magnets, and the magnetic attractive force becomes stronger as the number of opposing permanent magnets is greater. As the magnetic attractive force becomes stronger, the permissible thrust of the magnetic rack and pinion mechanism also becomes greater.

Japanese Unexamined Patent Application Publication No. 2007-215264 (page 11, FIG. 10) discloses an actuator which includes a non-contact magnetic velocity-reduction drive and which converts rotational motion to linear motion. The non-contact magnetic velocity-reduction drive includes a base, a drive head, and a permanent magnet. The base is constituted by a magnetic body having projecting portions and recessed portions which are alternately disposed at predetermined intervals on the top surface of the base. In the drive head, a magnetic circuit is formed between an internal space of the drive head and a base opposing surface which opposes the top surface of the base. The permanent magnet is rotatably fitted in the internal space of the drive head. In this magnetic velocity-reduction drive, a closed magnetic field which passes through the drive head and the base is formed due to the presence of the permanent magnet. The closed magnetic field is formed along the path of the magnetic circuit of the drive head and the top surface of the base due to the presence of a magnetic flux passing through an area where the magnetic circuit of the drive head opposes the projecting portions of the base. In this magnetic velocity-reduction drive, by a rotating magnetic field (closed magnetic field) generated by rotating the permanent magnet, the thrust in the horizontal direction (restoration force of a magnetic field) is obtained, and then, rotational motion of the permanent magnet is converted into linear motion of the base (in this actuator, since the base is fixed, the drive head, which is movable, actually performs linear motion).

The strength of the thrust of the rotating magnetic field differs depending on the magnetic field intensity (magnetic flux density or the number of magnetic lines of force per unit area). The thrust of the rotating magnetic field becomes stronger as the magnetic field intensity becomes greater. If the thrust of the rotating magnetic field is strong, the permissible thrust that can be transmitted between the drive shaft of the rotating magnet and the base is increased. Accordingly, in order to generate a large permissible thrust, it is necessary to increase the number of magnetic lines of force per unit area which forms a rotating magnetic field.

In the magnetic power transmission device disclosed in Japanese Unexamined Patent Application Publication No. 2008-215429, since permanent magnets are disposed both on the shaft-like member and the support plates, if a long moving distance (stroke) of the support plates which perform linear motion is required, it is necessary to increase the number of permanent magnets or to increase the pitch between the permanent magnets disposed on the shaft-like member. If many permanent magnets are disposed, the shaft-like member is likely to sag, thereby decreasing the positioning precision. Under the current situation, a low-cost, high-precision magnetic power transmission device is demanded. Thus, if a long stroke is required, it is difficult to use the magnetic power transmission device disclosed in this publication.

If the pitch between the permanent magnets is increased, the number of permanent magnets disposed on the shaft-like member which oppose the permanent magnets of the support plates is decreased. Accordingly, the permissible thrust of the magnetic rack and pinion mechanism is decreased. Thus, if a large permissible thrust is desired, it is also difficult to use the magnetic power transmission device disclosed in this publication.

In the magnetic velocity-reduction drive disclosed in Japanese Unexamined Patent Application Publication No. 2007-215264, the magnetic field intensity of the closed magnetic field is determined by the number of magnetic lines of force passing through the area where the magnetic circuit of the drive head opposes the projecting portions of the base. Among these magnetic lines of force, there are some magnetic lines of force which pass through an area where the magnetic circuit of the drive head does not oppose the projecting portions of the base. However, such magnetic lines of force produce very little influence on the magnetic field intensity of the closed magnetic field.

Accordingly, in the magnetic velocity-reduction drive disclosed in this publication, in order to increase the permissible thrust, it is necessary to increase the area by which the magnetic circuit of the drive head and the projecting portions of the base oppose each other. Thus, the size of the magnetic velocity-reduction drive is inevitably increased. Under the current situation, a small magnetic velocity-reduction drive mechanism is demanded. Thus, it is difficult to use the magnetic velocity-reduction drive disclosed in this publication.

If the area by which the magnetic circuit of the drive head and the projecting portions of the base oppose each other is increased while maintaining a small size of the magnetic velocity-reduction drive, the pitch of the projecting portions of the base has to be increased. Then, the number of projecting portions of the base that can be disposed within the same length of the base is decreased, which makes it difficult to increase the acceleration reduction velocity ratio of the magnetic velocity-reduction drive mechanism. Accordingly, if a large acceleration reduction velocity ratio is desired, it is also difficult to use the magnetic velocity-reduction drive disclosed in this publication.

SUMMARY

In view of the above-described background, the present invention has been made to solve the above-described problems. Accordingly, it is an object of the present invention to provide a low-cost, high-precision, small rotational-linear motion converter that implements a large permissible thrust and a wide-range acceleration reduction velocity ratio.

In order to achieve the above-described object, according to an aspect of the present invention, there is provided a rotational-linear motion converter including a cylindrical magnet rotor, a linear rail, a teeth row, and a magnet row.

The cylindrical magnet rotor includes a magnet row magnetized in a radial direction of the magnet rotor. The linear rail includes a plurality of projecting portions and recessed portions. The teeth row includes teeth and allows a magnetic flux flowing from the magnet row of the magnet rotor to pass between the magnet rotor and the rail. The magnet row includes magnets and is magnetized in an extending direction of the rail in order to align the magnetic flux flowing from the magnet row of the magnet rotor toward the projecting portions and the recessed portions of the rail. In the magnet row magnetized in the extending direction of the rail, the same polarity faces of adjacent magnets oppose each other in the extending direction of the rail.

In the above-described rotational-linear motion converter, in the magnet row magnetized in the extending direction of the rail, the same polarity faces of adjacent magnets oppose each other in the extending direction of the rail. Accordingly, the magnetic flux transferred between the drive head and the rail flows in the state in which most of the magnetic lines of force are aligned, thereby substantially eliminating a leakage flux.

According to an aspect of the present invention, it is possible to provide a low-cost, high-precision, small rotational-linear motion converter while implementing a large permissible thrust and a wide-range acceleration reduction velocity ratio.

DETAILED DESCRIPTION

Figure 1:
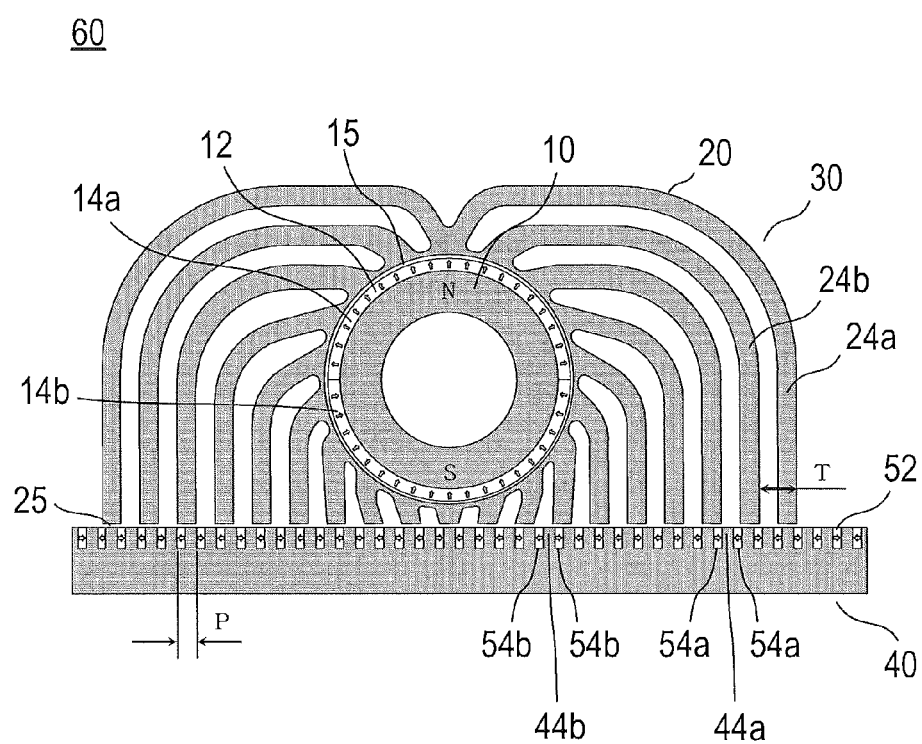
FIG. 1 is a schematic view illustrating a rotational-linear motion converter according to a first embodiment.

The configurations and the operations of rotational-linear motion converters according to first through eighth embodiments of the present invention will be described below with reference to the accompanying drawings. In a description of the elements shown in the drawings, the same elements are designated by like reference numerals, and an explanation of the same element will be given only once. Additionally, the dimension ratios of the elements shown in the drawings may be exaggerated for the purpose of representation and may be different from the actual dimension ratios.

[First Embodiment]

Figure 2:
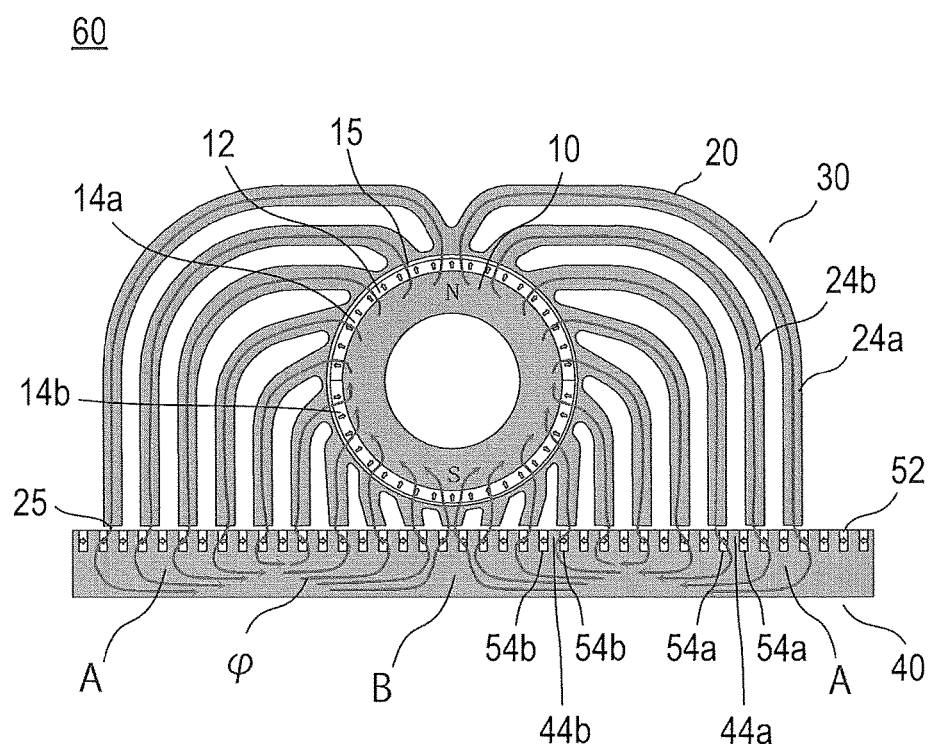
FIG. 2 illustrates a closed magnetic field formed in the rotational-linear motion converter shown in FIG. 1.
Figure 3:
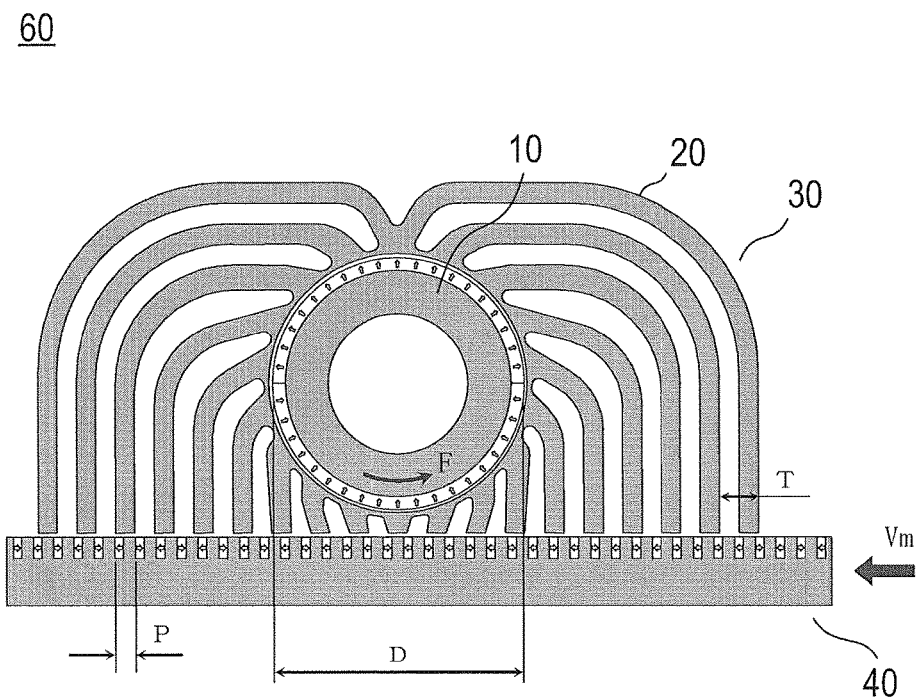
FIG. 3 illustrates motion conversion of the rotational-linear motion converter shown in FIG. 1.

FIG. 1 is a schematic view illustrating a rotational-linear motion converter 60 according to a first embodiment. FIG. 2 illustrates a closed magnetic field formed in the rotational-linear motion converter 60 shown in FIG. 1. FIG. 3 illustrates motion conversion of the rotational-linear motion converter 60 shown in FIG. 1. The configuration and the operation of the rotational-linear motion converter 60 according to the first embodiment will be described below.

[Configuration of Rotational-Linear Motion Converter]

FIG. 1 shows a cross section of the rotational-linear motion converter 60 which is cut in a direction perpendicular to the direction of the rotational axis of a magnet rotor 10. The directions of white arrows indicated within the magnet rotor 10 shown in FIG. 1 are magnetization directions of permanent magnets 14a and 14b, which will be discussed later. The heads of the arrows indicate the N pole, while the tails of the arrows indicate the S pole.

The rotational-linear motion converter 60 includes a drive head 30 and a rail 40. The drive head 30 includes a magnet rotor 10 and a teeth row 20. The magnet rotor 10 is concentrically disposed within the drive head 30 so that a gap 15 may be formed between the magnet rotor 10 and a cylindrical internal space of the drive head 30. The teeth row 20 extends like octopus' tentacles (legs) from the internal space of the drive head 30 toward the rail 40 so that a gap 25 may be formed between the teeth row 20 and the rail 40. The drive head 30 and the rail 40 are disposed such that the teeth row 20 of the drive head 30 opposes the rail 40, and the drive head 30 and the rail 40 are relatively movable in a direction in which the rail 40 extends. In the first embodiment, the drive head 30 is fixed so that it will not be movable, and the magnet rotor 10 is rotatably supported within the drive head 30.

The magnet rotor 10 includes a magnet row 12 constituted by two semicircular permanent magnets 14a and 14b which are magnetized in the radial direction. The permanent magnet 14a is magnetized as the S pole at the inner periphery thereof and as the N pole at the outer periphery thereof. The permanent magnet 14b is magnetized as the N pole at the inner periphery thereof and as the S pole at the outer periphery thereof. Accordingly, the magnet rotor 10 has two poles, which are the N pole on the upper side and the S pole on the lower side, as viewed from the position of the magnet rotor 10 shown in FIG. 1.

In FIG. 1, the two semicircular permanent magnets 14a and 14b are shown by way of example. Alternatively, one ring-like permanent magnet may be used in which the outer portion of one half is magnetized as the N pole and the outer portion of the other half is magnetized as the S pole.

As shown in FIG. 1, the magnet rotor 10 has two poles. However, the number of poles of the magnet rotor 10 may be M (M is an even number) other than two, which will be discussed later in third through eighth embodiment.

The magnet rotor 10 is formed by punching a magnetic body, such as an electromagnetic steel sheet, silicon steel, carbon steel, electromagnetic stainless steel, a dust core, or an amorphous magnetic core, by using a die.

The teeth row 20 allows a magnetic flux flowing from the magnet row 12 of the magnet rotor 10 to pass through the teeth row 20 toward the rail 40. The teeth row 20 also allows a magnetic flux passing through the rail 40 to pass through the teeth row 20 toward the magnet row 12 of the magnet rotor 10. The teeth row 20 is constituted by teeth 24a and 24b. The number of teeth 24a and 24b assigned to each pole of the magnet rotor 10 is nine. The shapes and the lengths of the teeth 24a and 24b are different from each other so that a magnetic flux within each of the teeth 24a and 24b is directed toward only one of the magnet row 12 of the magnet rotor 10 and the rail 14.

The distal ends of the teeth 24a and 24b are interconnected to each other in the circumferential direction of the magnet rotor 10 so as to form one cylindrical internal space. The interconnecting portions at the distal ends are formed to be thin in the radial direction of the magnet rotor 10 so that a leakage of a magnetic flux between adjacent teeth 24a and 24b can be prevented. The forward ends of the teeth 24a and 24b are formed so that a teeth pitch will be T in the extending direction of the rail 40.

The teeth pitch T of the teeth row 20 is set by considering the number Mt of teeth assigned to each pole of the magnet rotor 10 and a magnet pitch P of a magnet row 52, which will be discussed later, so that, when the magnet rotor 10 is rotated, the rail 40 can be moved, or when the rail 40 is moved, the magnet rotor 10 can be rotated. More specifically, the teeth pitch T which satisfies the relationship expressed by equation (1) is formed:

$$T=(2 \cdot P)+k \cdot (P/Mt) \quad (k=\pm 1) \tag{1}$$

where P denotes the magnet pitch of the magnet row 52, and Mt denotes the number of teeth assigned to each pole of the magnet rotor 10.

In FIG. 1, the number Mt of teeth assigned to each pole of the magnet rotor 10 is nine, as discussed above. Accordingly, when k is −1, the teeth pitch T to be formed in the teeth row 20 is calculated as (P·17/9) from equation (1), and when k is +1, the teeth pitch T to be formed in the teeth row 20 is calculated as (P·19/9) from equation (1). In the rotational-linear motion converter 60 shown in FIG. 1, the teeth pitch T at the forward ends of the teeth row 20 is formed to be (P·17/9).

In FIG. 1, the teeth row 20 has a symmetrical arrangement on the right and left sides with respect to the magnet rotor 10 by way of example. However, the teeth row 20 is not restricted to this arrangement, and may have an asymmetrical arrangement on the right and left sides.

In FIG. 1, the teeth row 20 is formed all along the periphery of the magnet rotor 10 byway of example. However, the teeth row 20 may be formed only on part of the periphery of the magnet rotor 10 as long as the number of teeth 24a and 24b is equally assigned to magnetic poles having different polarities of the magnet rotor 10, which will be discussed later in a third embodiment.

As in the magnet rotor 10, the teeth row 20 is formed by punching a magnetic body, such as an electromagnetic steel sheet, silicon steel, carbon steel, electromagnetic stainless steel, a dust core, or an amorphous magnetic core, by using a die.

In the rail 40, recessed portions having a pitch P are formed in the extending direction of the rail 40. The recessed portions contain therein permanent magnets 54a and 54b magnetized in the extending direction of the rail 40. Accordingly, the magnet pitch of the permanent magnets 54a and the permanent magnets 54b is also P. Since the permanent magnets 54a and 54b are contained in the recessed portions, the permanent magnets 54a and 54b and magnetic bodies 44a and 44b are alternately disposed in the extending direction of the rail 40.

The rail 40 includes the above-described magnet row 52, which is magnetized in the extending direction of the rail 40. The magnet row 52 aligns the magnetic flux which will pass through the rail 40. Due to the function of the magnet row 52, a magnetic flux passes through the rail 40 in the state in which most of the magnetic lines of force are aligned, thereby reducing a leakage flux. In the magnet row 52, the same polarity (N pole) faces of adjacent permanent magnets 54a oppose each other with a magnetic body 44a therebetween in the extending direction of the magnet row 52. Moreover, the same polarity (S pole) faces of adjacent permanent magnets 54b oppose each other with a magnetic body 44b therebetween in the extending direction of the magnet row 52. Concerning the magnetization directions of the magnet row 52, the heads of the arrows indicate the N pole, while the tails of the arrows indicate the S pole. Accordingly, a magnetic body 44a is disposed between two permanent magnets 54a with their N pole faces opposing each other, while a magnetic body 44b is disposed between two permanent magnets 54b with their S pole faces opposing each other.

In the rail 40, the magnetic bodies 44a, each being sandwiched between the N-pole faces of the permanent magnets 54a, and the magnetic bodies 44b, each being sandwiched between the S-pole faces of the permanent magnets 54b, are alternately disposed in the extending direction of the rail 40. Accordingly, in the rail 40, magnetic poles, that is, the S pole and the N pole which are alternately disposed in the rail 40, are formed.

As in the magnet rotor 10 and the teeth row 20, the rail 40 is formed by punching a magnetic body, such as an electromagnetic steel sheet, silicon steel, carbon steel, electromagnetic stainless steel, a dust core, or an amorphous magnetic core, by using a die.

[Operation of Rotational-Linear Motion Converter]
(Formation of Closed Magnetic Field)

A description will first be given, with reference to FIG. 2, of a closed magnetic field H formed in the rotational-linear motion converter 60 shown in FIG. 1. The arrows shown in FIG. 2 indicate magnetic lines of force, and the heads of the arrows indicate the directions of magnetic lines of force.

As shown in FIG. 2, within the magnet rotor 10, a magnetic flux $\phi$ flowing from the permanent magnet 14b to the permanent magnet 14a is distributed such that it divides the cylinder of the magnet rotor 10 into two portions. The magnetic flux $\phi$ flowing from the permanent magnet 14a flows to the rail 40 through the teeth 24a and 24b which are assigned to the permanent magnet 14a. Then, the magnetic flux $\phi$ entering the rail 40 flows to the magnetic bodies 44a and 44b which oppose the teeth 24a and 24b assigned to the permanent magnet 14b in the state in which the magnetic lines of force are aligned. The magnetic flux $\phi$ passing through the rail 40 flows into the permanent magnet 14b of the magnet rotor 10 via the teeth 24a and 24b assigned to the permanent magnet 14b. In this manner, a closed magnetic field looping within the magnet rotor 10, the teeth row 20, and the rail 40 is formed.

As viewed from the position of the rotational-linear motion converter 60 shown in FIG. 2, the teeth 24a and 24b on the upper half of the teeth row 20 are assigned to the permanent magnet 14a, while the teeth 24a and 24b on the lower half of the teeth row 20 are assigned to the permanent magnet 14b. Accordingly, the closed magnetic field H is divided to a closed magnetic field group flowing clockwise and a closed magnetic field group flowing counterclockwise on the right and left sides, respectively. However, depending on the rotation position of the magnet rotor 10, teeth 24a and 24b assigned to the permanent magnets 14a and 14b are changed. Thus, teeth 24a and 24b forming the closed magnetic field group flowing clockwise and teeth 24a and 24b forming the closed magnetic field group flowing counterclockwise are not uniquely determined.

The number of magnetic lines of force forming the magnetic flux $\phi$ passing through the teeth 24a and 24b and the flowing direction thereof are changed in accordance with the rotation position of the magnet rotor 10. Then, when the number of magnetic lines of force and the flowing direction thereof are changed, the closed magnetic field H looping within the magnet rotor 10, the teeth row 20, and the rail 40 is also changed. When the closed magnetic field H is changed, a restoration force of a magnetic field acts on the closed magnetic field H so as to maintain the balance of the closed magnetic field H. This restoration force of a magnetic field serves as a thrust to the rail 40 in the horizontal direction, thereby implementing relative displacement motion between the rail 40 and the drive head 30. Accordingly, rotational motion of the magnet rotor 10 can be converted into linear motion of the rail 40 or the drive head 30. The relationship between the rotation position of the magnet rotor 10 and the flow of the magnetic flux $\phi$ will be described in detail in an eighth embodiment, which will be discussed later.

The magnetic flux $\phi$ within the rail 40 will be discussed below more specifically.

In the rail 40, receiving areas A in which the magnetic flux $\phi$ is received from the permanent magnet 14a via the teeth 24a and 24b assigned to the permanent magnet 14a are formed. In the rail 40, a transfer area B from which the magnetic flux $\phi$ will be transferred to the permanent magnet 14b via the teeth 24a and 24b assigned to the permanent magnet 14b is also formed. Within the rail 40, the magnetic flux $\phi$ flows from the receiving areas A to the transfer area B. In FIG. 2, both side portions of the rail 40 serve as the receiving areas A for receiving the magnetic flux $\phi$, while the central portion of the rail 40 serves as the transfer area B for transferring the magnetic flux $\phi$. Thus, the magnetic flux $\phi$ within the rail 40 flows from the side portions to the central portion of the rail 40.

Each of the magnetic bodies 44a of the rail 40 is sandwiched between two permanent magnets 54a with their N pole faces opposing each other in the extending direction of the rail 40. Each of the magnetic bodies 44b of the rail 40 is sandwiched between two permanent magnets 54b with their S pole faces opposing each other in the extending direction of the rail 40. Accordingly, in the receiving areas A of the rail 40, the magnetic flux $\phi$ flowing from the permanent magnet 14a can be forcefully directed to the magnetic bodies 44a. In the transfer area B of the rail 40, the magnetic flux $\phi$ which will flow to the permanent magnet 14b can be forcefully transferred from the magnetic bodies 44b to the permanent magnet 14b. Due to a magnetic force of the permanent magnets 54a and 54b, the magnetic flux $\phi$ within the rail 40 can be forcefully directed to the magnetic bodies 44a and 44b. Thus, when the magnetic flux $\phi$ is transferred between the drive head 30 and the rail 40, a leakage flux is substantially eliminated.

In this manner, the magnet row 52 aligns the magnetic flux $\phi$ transferring between the drive head 30 and the rail 40 toward the magnetic bodies 44a and 44b. In this case, the magnet row 52 is capable of aligning most of the magnetic lines of force forming the magnetic flux $\phi$ toward the magnetic bodies 44a and 44b, thereby substantially eliminating a leakage flux. As a result, the magnetic flux $\phi$ can be effectively converted into a thrust.

As discussed above, in the rotational-linear motion converter 60 of the first embodiment, due to the function of the magnet row 52 of the rail 40, a closed magnetic flux is effectively directed toward the magnetic bodies 44a and 44b, thereby effectively reducing a leakage flux between the drive head 30 and the rail 40. Additionally, a magnetic coupling force between the drive head 30 and the rail 40 can be enhanced, thereby making it possible to increase the permissible thrust. Since a closed magnetic flux can be used effectively, the size of the drive head 30 can be reduced. Thus, a large permissible thrust can be implemented while maintaining a small size of the drive head 30. Transferring of a magnetic flux between the drive head 30 and the rail 40 is performed via the teeth row 20 produced by die-punching. Accordingly, high positioning precision can be achieved when performing relative displacement motion between the drive head 30 and the rail 40 without depending on the magnetization precision of the permanent magnets 14a and 14b.

(Principle of Acceleration and Reduction of Velocity)

A description will now be given of how the rail 40 is moved when the magnet rotor 10 is rotated in the state in which a closed magnetic flux is formed in the magnet rotor 10, the teeth row 20, and the rail 40, as shown in FIG. 2.

FIG. 3 illustrates rotation-linear motion conversion of the rotational-linear motion converter 60.

It is now assumed that:
the number of poles of the magnet rotor 10 is M (M is an even number);
the diameter of the magnet rotor 10 is D;
the circle ratio (pi) is π;
the magnet pitch of the magnet row 52 is P;
the coefficient k is 1 or −1;
the rotational velocity of the magnet rotor 10 is F;
the peripheral velocity of the magnet rotor 10 is Vr; and
the motion velocity of the rail 40 is Vm.

In this case, the peripheral velocity Vr of the magnet rotor 10 can be expressed by Vr=F·π·D, and the motion velocity Vm of the rail 40 can be expressed by Vm=k·F·M·P (k=±1).

Accordingly, the relationship between the peripheral velocity Vr of the magnet rotor 10 and the motion velocity Vm of the rail 40 can be expressed by equation (2).

$$Vm/Vr=(k \cdot M \cdot P)/(\pi \cdot D) \ (k=\pm 1) \quad (2)$$

That is, when the magnet rotor 10 rotates through one revolution, the rail 40 moves by M·P. Since the magnet rotor 10 is supported within the internal space of the drive head 30, the peripheral velocity Vr of the magnet rotor 10 also indicates the motion velocity of the drive head 30.

Equation (2) shows that there is a difference between the peripheral velocity Vr of the magnet rotor 10 and the motion velocity Vm of the rail 40 and that the velocity can be accelerated and reduced between the drive head 30 and the rail 40. If the sign of the peripheral velocity Vr of the magnet rotor 10 and the sign of the motion velocity Vm of the rail 40 are opposite, the rail 40 is moved in an opposite direction, as viewed from the magnet rotor 10.

In the case of the rotational-linear motion converter 60 of the first embodiment, the number M of poles of the magnet rotor 10 is two, and the coefficient k is −1. Accordingly, by substituting M=2 and k=−1 into equation (2), the following equation is obtained.

$$Vm/Vr=-2 \cdot P/(\pi \cdot D)$$

Thus, if the drive head 30 is fixed so that it will not be movable, when the magnet rotor 10 is rotated through one revolution, the rail 40 moves by −2·P. The thin black arrow and the thick black arrow in FIG. 3 indicate the rotating direction of the magnet rotor 10 and the moving direction of the rail 40, respectively.

The configuration and the operation of the rotational-linear motion converter 60 of the first embodiment have been discussed above. As described above, when the magnet rotor 10 is rotated or when the rail 40 is moved, the closed magnetic field H formed between the drive head 30 and the rail 40 is disturbed, and in order to maintain the balance of the closed magnetic field H, the drive head 30 and the rail 40 perform relative displacement motion. Through the operation for maintaining the balance of the closed magnetic field H, the relationship between the velocity of the drive head 30 and that of the rail 40 can be obtained, as expressed by equation (2).

As described above, in the rotational-linear motion converter 60 of the first embodiment, the rail 40 includes the magnet row 52 which is magnetized in the extending direction of the rail 40. Since the magnet row 52 aligns the magnetic flux ϕ which will pass through the rail 40, a leakage flux can be reduced to a minimal level, and a large permissible thrust and a wide-range acceleration reduction velocity ratio can be implemented.

[Second Embodiment]

Figure 4:
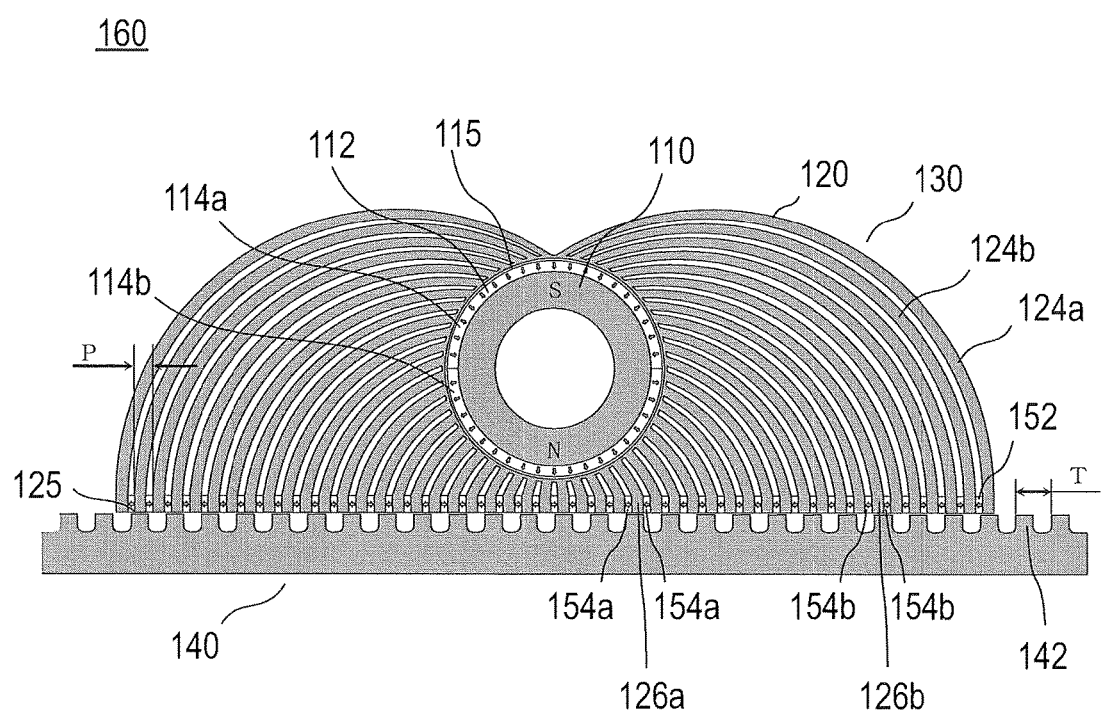
FIG. 4 is a schematic view illustrating a rotational-linear motion converter according to a second embodiment.
Figure 5:
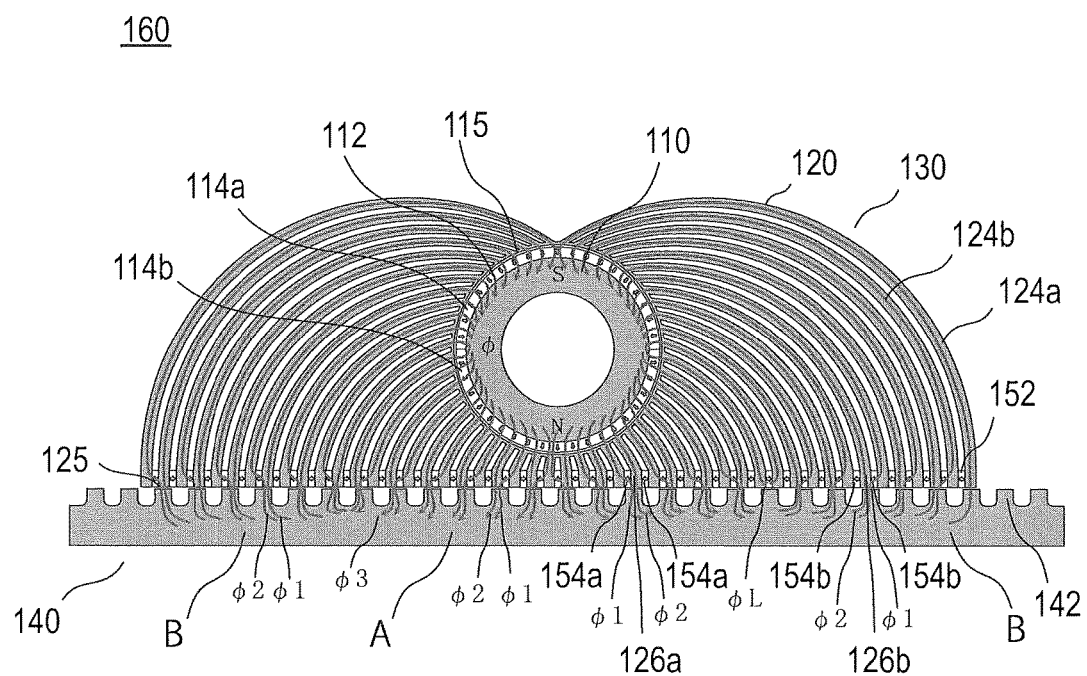
FIG. 5 illustrates a closed magnetic field formed in the rotational-linear motion converter shown in FIG. 4.
Figure 6:
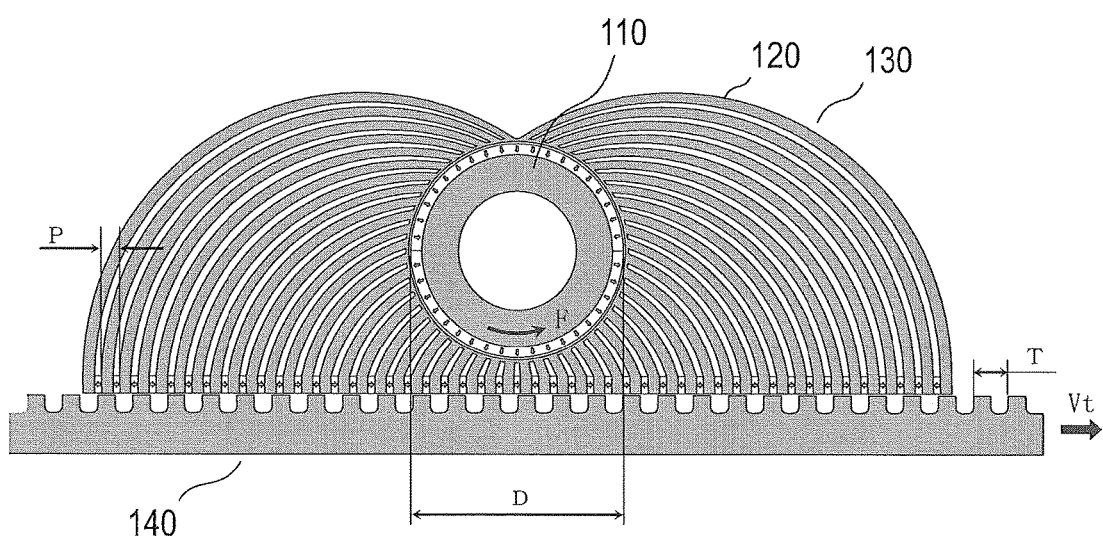
FIG. 6 illustrates motion conversion of the rotational-linear motion converter shown in FIG. 4.

A rotational-linear motion converter 160 according to a second embodiment will be described below with reference to FIGS. 4, 5, and 6. FIG. 4 is a schematic diagram of the rotational-linear motion converter 160. FIG. 5 illustrates a closed magnetic field formed in the rotational-linear motion converter 160 shown in FIG. 4. FIG. 6 illustrates motion conversion of the rotational-linear motion converter 160 shown in FIG. 4.

As shown in FIG. 4, the rotational-linear motion converter 160 of the second embodiment is different from the rotational-linear motion converter 60 of the first embodiment in that a magnet row 152 is not contained in a rail 140, but is contained in a teeth row 120.

[Configuration of Rotational-Linear Motion Converter]

The rotational-linear motion converter 160 includes a drive head 130 and a rail 140. The drive head 130 includes a magnet rotor 110 and a teeth row 120. The magnet rotor 110 is concentrically disposed within the drive head 130 so that a gap 115 may be formed between the magnet rotor 110 and a cylindrical internal space of the drive head 130. The teeth row 120 extends like octopus' tentacles (legs) from the internal space of the drive head 130 toward the rail 140 so that a gap 125 may be formed between the teeth row 120 and the rail 140. The drive head 130 and the rail 140 are disposed such that the teeth row 120 of the drive head 130 opposes the rail 140, and the drive head 130 and the rail 140 are relatively movable in a direction in which the rail 140 extends. In the second embodiment, the drive head 130 is fixed so that it will not be movable, and the magnet rotor 110 is rotatably supported within the drive head 130.

The magnet rotor 110 includes a magnet row 112 constituted by two semicircular permanent magnets 114a and 114b which are magnetized in the radial direction. The permanent magnet 114a is magnetized as the N pole at the inner periphery thereof and as the S pole at the outer periphery thereof. The permanent magnet 114b is magnetized as the S pole at the inner periphery thereof and as the N pole at the outer periphery thereof. Accordingly, the magnet rotor 110 has two poles, which are the S pole on the upper side and the N pole on the lower side, as viewed from the position of the magnet rotor 110 shown in FIG. 4. The configurations of the other parts of the magnet rotor 110 are the same as those of the first embodiment.

The teeth row 120 is constituted by teeth 124a and 124b. The number of teeth 124a and 124b assigned to each pole of the magnet rotor 110 is 24. The shapes and the lengths of the teeth 124a and 124b are different from each other so that a magnetic flux within each of the teeth 124a and 124b is directed toward only one of the magnet row 112 of the magnet rotor 110 and the rail 140.

The distal ends of the teeth 124a and 124b are interconnected to each other in the circumferential direction of the magnet rotor 110 so as to form one cylindrical internal space. The interconnecting portions at the distal ends are formed to be thin in the radial direction of the magnet rotor 110 so that a leakage of a magnetic flux between adjacent teeth 124a and 124b can be prevented.

The forward ends of the teeth 124a and 124b are formed so that a teeth pitch will be P in the extending direction of the rail 140. Each of permanent magnets 154a and 154b magnetized in the extending direction of the rail 140 is contained between the teeth 124a and 124b. Accordingly, the magnet pitch of the permanent magnets 154a and the permanent magnets 154b is also P. Since each of the permanent magnets 154a and 154b is contained between the teeth 124a and 124b, at the forward ends of the teeth row 120, the permanent magnets 154a and 154b and magnetic bodies 126a and 126b are alternately disposed in the extending direction of the rail 40.

The teeth row 120 includes the above-described magnet row 152, which is magnetized in the extending direction of the rail 140. The magnet row 152 aligns the magnetic flux which will pass through the teeth row 120. Due to the function of the magnet row 152, a magnetic flux passes through the teeth row 120 in the state in which most of the magnetic lines of force are aligned, thereby reducing a leakage flux. In the magnet row 152, the same polarity (N pole) faces of adjacent permanent magnets 154a oppose each other with a magnetic body 126a therebetween in the extending direction of the rail 140. Moreover, the same polarity (S pole) faces of adjacent permanent magnets 154b oppose each other with a magnetic body 126b therebetween in the extending direction of the rail 40. Concerning the magnetization directions of the permanent magnets 154a and 154b of the magnet row 152, the heads of the arrows indicate the N pole, while the tails of the arrows indicate the S pole. Accordingly, a magnetic body 126a is disposed between two permanent magnets 154a with their N pole faces opposing each other, while a magnetic body 126b is disposed between two permanent magnets 154b with their S pole faces opposing each other.

At the forward ends of the teeth row 120, the magnetic bodies 126a, each being sandwiched between the N-pole faces of the permanent magnets 154a, and the magnetic bodies 126b, each being sandwiched between the S-pole faces of the permanent magnets 154b, are alternately disposed in the extending direction of the rail 140. Accordingly, at the forward ends of the teeth row 120, magnetic poles, that is, the S pole and the N pole which are alternately disposed in the teeth row 120, are formed.

In FIG. 4, the teeth row 120 has a symmetrical arrangement on the right and left sides with respect to the magnet rotor 110 by way of example. However, the teeth row 120 is not restricted to this arrangement, and may have an asymmetrical arrangement on the right and left sides.

In FIG. 4, the teeth row 120 is formed all along the magnet rotor 110 by way of example. However, the teeth row 120 may be formed only on part of the periphery of the magnet rotor 110 as long as the number of teeth 124a and 124b is equally assigned to magnetic poles having different polarities of the magnet rotor 110, which will be discussed later in a fourth embodiment.

As in the magnet rotor 110, the teeth row 120 is formed by punching a magnetic body, such as an electromagnetic steel sheet, silicon steel, carbon steel, electromagnetic stainless steel, a dust core, or an amorphous magnetic core, by using a die.

The rail 140 allows a magnetic flux flowing from the magnet row 112 of the magnet rotor 110 to pass through the teeth row 120 toward the rail 140 via the magnetic bodies 126a of the teeth row 120. The rail 140 also allows a magnetic flux to pass through the rail 140 toward the magnet row 112 of the magnet rotor 110 via the magnetic bodies 126a and 126b. In the rail 140, magnetic teeth 142 having a pitch T are formed in the extending direction thereof. The magnetic teeth 142 receive almost all the magnetic lines of force forming a magnetic flux passing through the magnetic bodies 126a of the teeth row 120.

The teeth pitch T of the magnetic teeth 142 provided in the rail 140 is set by considering the number Mp of teeth assigned to each pole of the magnet rotor 110 and the magnet pitch P of the magnet row 152 so that, when the magnet rotor 110 is rotated, the rail 140 can be moved, or when the rail 140 is moved, the magnet rotor 110 can be rotated. More specifically, the magnetic teeth 142 having the teeth pitch T which satisfies the relationship expressed by equation (3) is formed:

$$T=(2 \cdot P)+k \cdot (2 \cdot P/Mp) \quad (k=\pm 1) \tag{3}$$

where P denotes the magnet pitch of the magnet row 152, and Mp denotes the number of teeth assigned to each pole of the magnet rotor 110.

In FIG. 4, the number Mp of teeth assigned to each pole of the magnet rotor 110 is 24, as discussed above. Accordingly, when k is −1, the teeth pitch T of the magnetic teeth 142 to be formed in the rail 140 is calculated as (P·23/12) from equation (3), and when k is +1, the teeth pitch T of the magnetic teeth 142 to be formed in the rail 140 is calculated as (P·25/12) from equation (3). In the rotational-linear motion converter 160 shown in FIG. 4, the magnetic teeth 142 having a teeth pitch T of (P·23/12) is formed in the rail 140.

Recessed portions are formed between the magnetic teeth 142. In this case, when the drive head 130 or the rail 140 is moved, a vortex flows within the recessed portions, thereby producing air resistance. Accordingly, in order to reduce air resistance, it is desirable to fill the recessed portions with a non-magnetic material, such as an adhesive or a resin filler.

As in the magnet rotor 110 and the teeth row 120, the rail 140 is formed by punching a magnetic body, such as an electromagnetic steel sheet, silicon steel, carbon steel, electromagnetic stainless steel, a dust core, or an amorphous magnetic core, by using a die.

[Operation of Rotational-Linear Motion Converter]
(Formation of Closed Magnetic Field)

A description will first be given, with reference to FIG. 5, of a closed magnetic field H formed in the rotational-linear motion converter 160 shown in FIG. 4. The arrows shown in FIG. 5 indicate magnetic lines of force, and the heads of the arrows indicate the directions of magnetic lines of force.

As shown in FIG. 5, within the magnet rotor 110, a magnetic flux ϕ flowing from the permanent magnet 114a to the permanent magnet 114b is distributed such that it divides the cylinder of the magnet rotor 110 into two portions. The magnetic flux ϕ flowing from the permanent magnet 114b is directed toward the magnetic teeth 142 of the rail 140 via the teeth 124a and 124b of the teeth row 120 assigned to the permanent magnet 114b. The magnetic flux ϕ entering the rail 140 flows to the magnetic teeth 142 which oppose the teeth 124a and 124b assigned to the permanent magnet 114a in the state in which the magnetic flux ϕ is aligned. Then, the magnetic flux ϕ passing through the rail 140 flows to the permanent magnet 114a of the magnet rotor 110 through the teeth 124a and 124b assigned to the permanent magnet 114a. In this manner, a closed magnetic field H looping within the magnet rotor 110, the teeth row 120, and the rail 140 is formed.

As viewed from the position of the rotational-linear motion converter 160 shown in FIG. 5, the teeth 124a and 124b on the upper half of the teeth row 120 are assigned to the permanent magnet 114a, while the teeth 124a and 124b on the lower half of the teeth row 120 are assigned to the permanent magnet 114b. Accordingly, the closed magnetic field H is divided to a closed magnetic field group flowing counterclockwise and a closed magnetic field group flowing clockwise on the right and left sides, respectively. However, depending on the rotation position of the magnet rotor 110, teeth 124a and 124b assigned to the permanent magnets 114a and 114b are changed. Thus, teeth 124a and 124b forming the closed magnetic field group flowing clockwise and teeth 124a and 124b forming the closed magnetic field group flowing counterclockwise are not uniquely determined.

The number of magnetic lines of force forming the magnetic flux $\phi$ passing through the teeth 124a and 124b and the flowing direction thereof are changed in accordance with the rotation position of the magnet rotor 110. Then, when the number of magnetic lines of force and the flowing direction thereof are changed, the closed magnetic field H looping within the magnet rotor 110, the teeth row 120, and the rail 140 is also changed. When the closed magnetic field H is changed, a restoration force of a magnetic field acts on the closed magnetic field H so as to maintain the balance of the closed magnetic field H. This restoration force of a magnetic field serves as a thrust to the rail 140 in the horizontal direction, thereby implementing relative displacement motion between the rail 140 and the drive head 130. Accordingly, rotational motion of the magnet rotor 110 can be converted into linear motion of the rail 140 or the drive head 130. The relationship between the rotation position of the magnet rotor 110 and the flow of the magnetic flux $\phi$ will be described in detail in the eighth embodiment, which will be discussed later.

The flow of the magnetic flux $\phi$ between the teeth row 120 and the rail 140 will be discussed below more specifically.

There are two paths via which the magnetic flux $\phi$ directing from the permanent magnet 114b of the magnet rotor 10 to the rail 140 passes through the magnetic bodies 126a at the forward ends of the teeth row 120.

In one path, the magnetic flux $\phi$ first enters the permanent magnets 154a from the teeth row 120 and is then directed by the permanent magnets 154a from the magnetic bodies 126a to the magnetic teeth 142 of the rail 140. This path will be referred to as a "first path". In the other path, the magnetic flux $\phi$ directly enters the magnetic bodies 126a from the teeth row 120 and then flows to the magnetic teeth 142 of the rail 140. This path will be referred to as a "second path". A magnetic flux $\phi1$ reaches the magnetic teeth 142 of the rail 140 via the first path. A magnetic flux $\phi2$ reaches the magnetic teeth 142 of the rail 140 via the second path.

Each of the magnetic bodies 126a of the teeth row 120 is sandwiched between two permanent magnets 154a with their N pole faces opposing each other in the extending direction of the rail 140. Each of the magnetic bodies 126b of the rail 140 is sandwiched between two permanent magnets 154b with their S pole faces opposing each other in the extending direction of the rail 140. Accordingly, the magnetic flux $\phi1$ can be directed from the permanent magnet 114b to the magnetic bodies 126a. The magnetic flux $\phi2$, which would be possible to be a leakage flux which enters the magnetic body 126b from the permanent magnet 114b and reaches the magnetic teeth 142 of the rail 140, can be forcefully directed to the magnetic body 126a due to a magnetic force of the permanent magnet 154b.

In this manner, the magnet row 152 aligns the magnetic flux $\phi1$ and the magnetic flux $\phi2$ which will pass through the teeth row 120 toward the magnetic bodies 126a. In this case, the magnet row 152 causes the magnetic flux $\phi1$ and the magnetic flux $\phi2$ to pass through the teeth row 120 such that most of the magnetic lines of force are aligned toward the magnetic bodies 126a, thereby substantially eliminating a leakage flux. As a result, the magnetic flux $\phi1$ and the magnetic flux $\phi2$ can be effectively converted into a thrust.

In the rail 140, a receiving area A are formed in which the magnetic flux $\phi1$ and the magnetic flux $\phi2$ are received from the permanent magnet 114b via the teeth 124a and 124b assigned to the permanent magnet 114b. In the rail 140, transfer areas B from which the magnetic flux $\phi1$ and the magnetic flux $\phi2$ will be transferred to the permanent magnet 114a via the teeth 124a and 124b assigned to the permanent magnet 114a are also formed. Within the rail 140, the magnetic flux $\phi1$ and the magnetic flux $\phi2$ are converged to a magnetic flux $\phi3$, which then flows from the receiving area A to the transfer areas B. In FIG. 5, the central portion of the rail 140 serves as the receiving area A for receiving the magnetic flux $\phi1$ and the magnetic flux $\phi2$, while both side portions of the rail 140 serve as the transfer areas B for transferring the magnetic flux $\phi1$ and the magnetic flux $\phi2$. Thus, the magnetic flux $\phi3$ within the rail 140 is distributed such that it is divided into two portions on the right and left sides from the central portion to the side portions of the rail 140. There are two paths via which the magnetic flux $\phi3$, which will be directed to the permanent magnet 114a of the magnet rotor 110 from the rail 140, passes through the magnetic bodies 126a and 126b at the forward ends of the teeth row 120.

In one path, the magnetic flux $\phi$ first enters the permanent magnets 154a from the magnetic teeth 142 and is directed by the permanent magnets 154a from the magnetic bodies 126a to the permanent magnet 114a. This path will be referred to as a "third path". In the other path, the magnetic flux $\phi$ directly enters the magnetic bodies 126b from the magnetic teeth 142 and reaches the permanent magnet 114a. This path will be referred to as a "fourth path". The magnetic flux $\phi1$ reaches the permanent magnet 114a of the magnet rotor 110 via the third path. The magnetic flux $\phi2$ reaches the permanent magnet 114a of the magnet rotor 110 via the fourth path. In the adjacent teeth 124a and 124b positioned at both sides of the boundary between the permanent magnets 114a and 114b of the magnet row 112, a loop magnetic flux $\phi L$ which does not pass through the rail 140 is formed by a magnetic force of the permanent magnets 154a and 154b.

In this manner, the magnet row 152 aligns the magnetic flux $\phi$ transferring between the drive head 130 and the rail 140 toward the magnetic bodies 126a and 126b. In this case, the magnet row 152 is capable of aligning most of the magnetic lines of force forming the magnetic flux $\phi$ toward the magnetic bodies 126a and 126b, thereby substantially eliminating a leakage flux. As a result, the magnetic flux $\phi$ can be effectively converted into a thrust.

As discussed above, in the rotational-linear motion converter 160 of the second embodiment, due to the function of the magnet row 152, a closed magnetic flux is effectively directed toward the magnetic bodies 126a and 126b, thereby effectively reducing a leakage flux between the drive head 130 and the rail 140. Additionally, a magnetic coupling force between the drive head 130 and the rail 140 can be enhanced, thereby making it possible to increase the permissible thrust. Since a closed magnetic flux can be used effectively, the size of the drive head 130 can be reduced. Thus, a large permissible thrust can be implemented while maintaining a small size of the drive head 130. Transferring of a magnetic flux $\phi$ between the drive head 130 and the rail 140 is performed via the teeth row 120 produced by die-punching. Accordingly, high positioning precision can be achieved when performing relative displacement motion between the drive head 130 and the rail 140 without depending on the magnetization precision of the permanent magnets 114a and 114b.

(Principle of Acceleration and Reduction of Velocity)

A description will now be given of how the rail 140 is moved when the magnet rotor 110 is rotated in the state in which a closed magnetic flux is formed in the magnet rotor 110, the teeth row 120, and the rail 140, as shown in FIG. 5.

FIG. 6 illustrates rotation-linear motion conversion of the rotational-linear motion converter 160.

It is now assumed that:

the number of poles of the magnet rotor 110 is M (M is an even number);

the diameter of the magnet rotor 110 is D;

the circle ratio (pi) is $\pi$;

the teeth pitch of the magnet teeth 142 of the rail 140 is T;

the coefficient k is 1 or −1;

the rotational velocity of the magnet rotor 110 is F;

the peripheral velocity of the magnet rotor 110 is Vr; and the motion velocity of the rail 140 is Vt.

In this case, the peripheral velocity Vr of the magnet rotor 110 can be expressed by $Vr = F \cdot \pi \cdot D$, and the motion velocity Vt of the rail 140 can be expressed by $Vt = -k \cdot F \cdot M \cdot T/2$ ($k = \pm 1$).

Accordingly, the relationship between the peripheral velocity Vr of the magnet rotor 110 and the motion velocity Vt of the rail 140 can be expressed by equation (4).

$$Vt/Vr = (-k \cdot M \cdot T/2)/(\pi \cdot D) \quad (k = \pm 1) \tag{4}$$

That is, when the magnet rotor 110 rotates through one revolution, the rail 140 is moved by M·T/2. Since the magnet rotor 110 is supported within the internal space of the drive head 130, the peripheral velocity Vr of the magnet rotor 110 also indicates the motion velocity of the drive head 130.

Equation (4) shows that there is a difference between the peripheral velocity Vr of the magnet rotor 110 and the motion velocity Vt of the rail 140 and that the velocity can be accelerated and reduced between the drive head 130 and the rail 140. If the sign of the peripheral velocity Vr of the magnet rotor 110 and the sign of the motion velocity Vt of the rail 140 are opposite, the rail 140 is moved in an opposite direction, as viewed from the magnet rotor 110.

In the case of the rotational-linear motion converter 160 of the second embodiment, the number M of poles of the magnet rotor 110 is two, and the coefficient k is −1. Accordingly, by substituting M=2 and k=−1 into equation (4), the following equation is obtained.

$$Vt/Vr = T/(\pi \cdot D)$$

Thus, if the drive head 130 is fixed so that it will not be movable, when the magnet rotor 110 is rotated through one revolution, the rail 140 is moved by T. The thin black arrow and the thick black arrow in FIG. 6 indicate the rotating direction of the magnet rotor 110 and the moving direction of the rail 140, respectively.

The configuration and the operation of the rotational-linear motion converter 160 of the second embodiment have been discussed above. As described above, when the magnet rotor 110 is rotated or when the rail 140 is moved, the closed magnetic field H formed between the drive head 130 and the rail 140 is disturbed, and in order to maintain the balance of the closed magnetic field H, the drive head 30 and the rail 40 perform relative displacement motion. Through the operation for maintaining the balance of the closed magnetic field H, the relationship between the velocity of the drive head 130 and that of the rail 140 can be obtained, as expressed by equation (4).

As described above, the rotational-linear motion converter 160 of the second embodiment includes the magnet row 152 having the permanent magnets 154*a* and 154*b* which are magnetized in the extending direction of the rail 140 and which are formed between the forward ends of the teeth row 120. Since the magnet row 152 aligns the magnetic flux ϕ which will pass through the teeth row 120, a leakage flux can be reduced to a minimal level, and a large permissible thrust and a wide-range acceleration reduction velocity ratio can be implemented.

[Third Embodiment]

A rotational-linear motion converter 260 according to a third embodiment will be described below with reference to a schematic diagram of FIG. 7. The thin black arrow and the thick black arrow in FIG. 7 indicate the rotating direction of a magnet rotor 210 and the moving direction of a rail 240, respectively.

Figure 7:
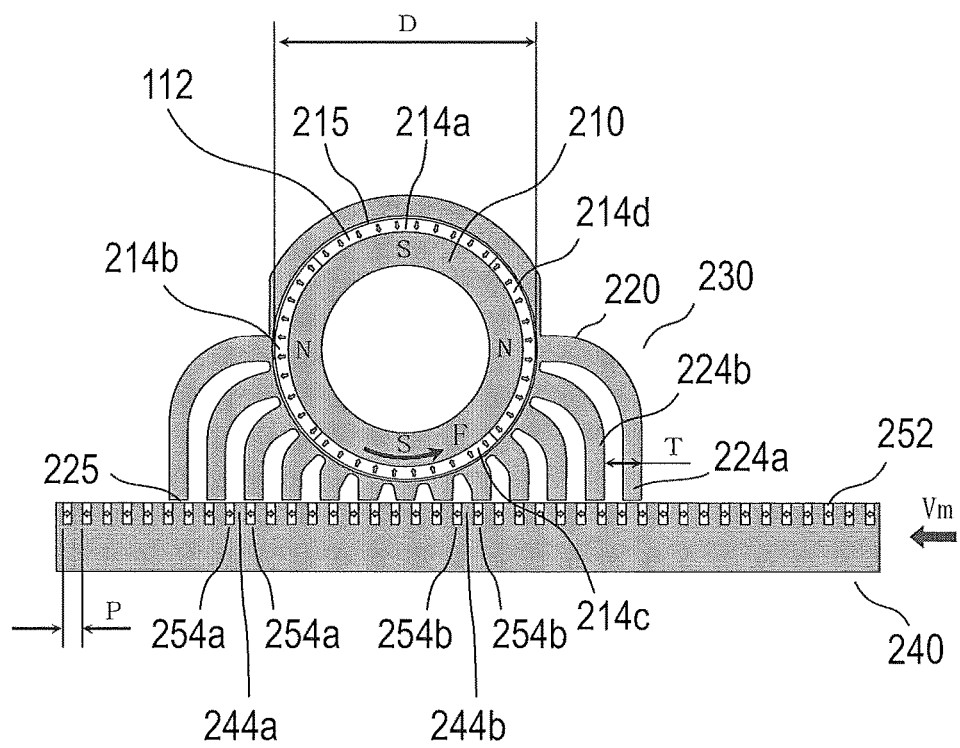
FIG. 7 is a schematic view illustrating a rotational-linear motion converter according to a third embodiment.

As shown in FIG. 7, the rotational-linear motion converter 260 is different from the rotational-linear motion converter 60 of the first embodiment in that a teeth row 220 is not formed all along the periphery of the magnet rotor 210, but is formed only on part of the periphery of the magnet rotor 210.

The rotational-linear motion converter 260 may be considered as a compact size of the rotational-linear motion converter 60 of the first embodiment.

[Configuration of Rotational-Linear Motion Converter]

The rotational-linear motion converter 260 includes a drive head 230 and a rail 240. The drive head 230 includes a magnet rotor 210 and a teeth row 220. The magnet rotor 210 is concentrically disposed within the drive head 230 so that a gap 215 may be formed between the magnet rotor 210 and a cylindrical internal space of the drive head 230. The teeth row 220 extends like octopus' tentacles (legs) from the internal space of the drive head 230 toward the rail 240 so that a gap 225 may be formed between the teeth row 220 and the rail 240. The drive head 230 and the rail 240 are disposed such that the teeth row 220 of the drive head 230 opposes the rail 240, and the drive head 230 and the rail 240 are relatively movable in the extending direction of the rail 240. The magnet rotor 210 is rotatably supported within the drive head 230.

The magnet rotor 210 includes a magnet row 212 constituted by four sector-shaped permanent magnets 214*a* through 214*d* which are magnetized in the radial direction. The permanent magnets 214*a* and 214*c* are disposed such that they oppose each other, and are magnetized as the N pole at the inner peripheries thereof and as the S pole at the outer peripheries thereof. The permanent magnets 214*b* and 214*d* are disposed such that they oppose each other, and are magnetized as the S pole at the inner peripheries thereof and as the N pole at the outer peripheries thereof. Accordingly, the magnet rotor 210 has four poles, more specifically, the S pole on the upper and lower sides and the N pole on the right and left sides, as viewed from the position of the magnet rotor 210 shown in FIG. 7. The S pole and the N pole are alternately disposed in the peripheral direction of the magnet rotor 210. The configurations of the other parts of the magnet rotor 210 are the same as those of the first embodiment.

In the teeth row 220, teeth 224*a* and 224*b* are formed only on part of the periphery of the magnet rotor 210 such that the number of teeth 224*a* and 224*b* assigned to the N pole of the magnet rotor 210 and that assigned to the S pole of the magnet rotor 210 are the same. In the third embodiment, the teeth 224*a* and 224*b*, six being assigned to each pole, are disposed on part of the periphery of the magnet rotor 210 positioned closer to the rail 240 so as to decrease the lengths of the teeth 224*a* and 224*b*. As the teeth 224*a* and 224*b* are shorter, magnetic resistance within the teeth 224*a* and 224*b* also becomes smaller. The configurations of the other parts of the teeth row 220 are the same as those of the first embodiment.

The rail 240 includes a magnet row 252 having a magnet pitch P and magnetized in the extending direction of the rail 240. The magnet row 252 aligns the magnetic flux which will pass through the rail 240. Due to the function of the magnet row 252, the magnetic flux passes through the rail 240 in the state in which most of the magnetic lines of force are aligned, thereby reducing a leakage flux. In the magnet row 252, the same polarity (N pole) faces of adjacent permanent magnets 254a oppose each other with a magnetic body 244a therebetween in the extending direction of the magnet row 252. Moreover, the same polarity (S pole) faces of adjacent permanent magnets 254b oppose each other with a magnetic body 244b therebetween in the extending direction of the magnet row 252. The configurations of the other parts of the rail 240 are the same as those of the first embodiment.

[Operation of Rotational-Linear Motion Converter]

A closed magnetic field H formed in the rotational-linear motion converter 260 is not shown. As in the rotational-linear motion converter 60 of the first embodiment, a closed magnetic field H looping in the magnet rotor 210, the teeth row 220, and the rail 240 is formed. In the third embodiment, since the teeth row 220 is formed on part of the periphery of the magnet rotor 210 positioned closer to the rail 240, the magnetic flux within the magnet rotor 210 also passes through part of the periphery thereof positioned closer to the rail 240.

The number of magnetic lines of force forming the closed magnetic field H in the rotational-linear motion converter 260 is smaller than that of the rotational-linear motion converter 60 of the first embodiment. However, the teeth 224a and 224b forming the teeth row 220 are shorter, thereby making it possible to reduce the size of the rotational-linear motion converter 260. Thus, a large permissible thrust can be provided with the small rotational-linear motion converter 260.

The principle of the acceleration and reduction of the velocity of the rotational-linear motion converter 260 is the same as that of the rotational-linear motion converter 60 of the first embodiment.

As in the rotational-linear motion converter 60 of the first embodiment, in the rotational-linear motion converter 260, the magnet row 252 magnetized in the extending direction of the rail 240 aligns the magnetic flux which will pass through the rail 240. Thus, a leakage flux can be reduced to a minimal level, and a large permissible thrust and a wide-range acceleration reduction velocity ratio can be implemented.

Additionally, in the rotational-linear motion converter 260, a closed magnetic field is formed by using the teeth row 220 only having short teeth 224a and 224b. Accordingly, a large permissible thrust can be provided with the small rotational-linear motion converter 260.

[Fourth Embodiment]

A rotational-linear motion converter 360 according to a fourth embodiment will be described below with reference to a schematic diagram of FIG. 8. The thin black arrow and the thick black arrow in FIG. 8 indicate the rotating direction of a magnet rotor 310 and the moving direction of a rail 340, respectively.

Figure 8:
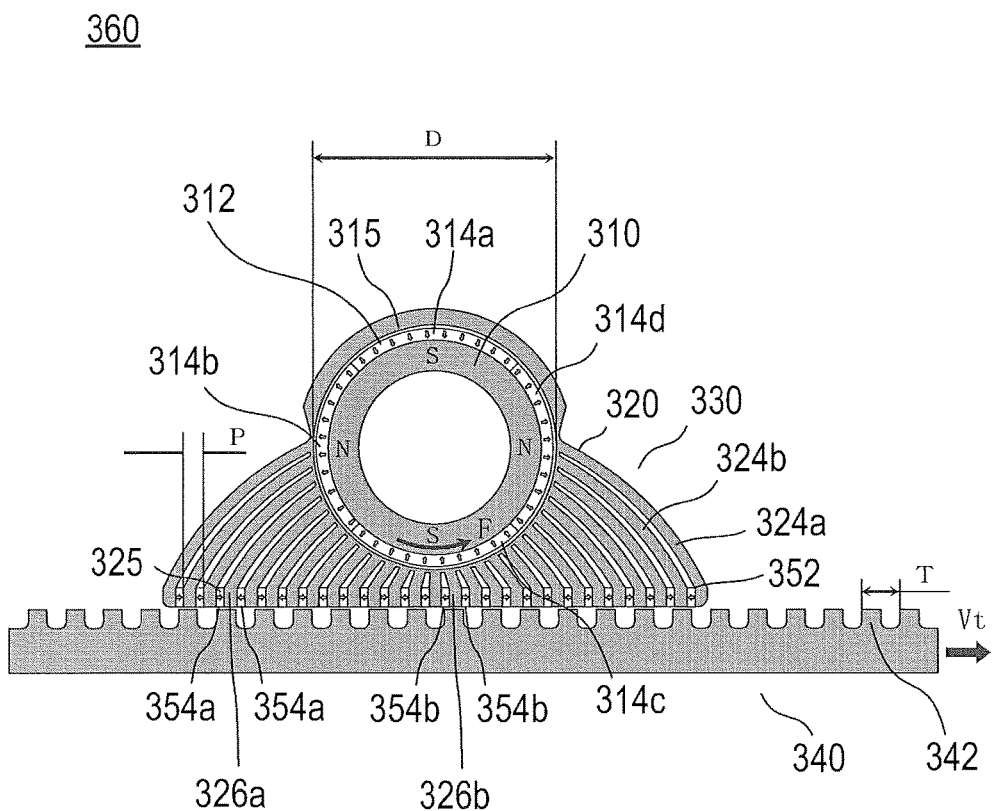
FIG. 8 is a schematic view illustrating a rotational-linear motion converter according to a fourth embodiment.

As shown in FIG. 8, the rotational-linear motion converter 360 is different from the rotational-linear motion converter 160 of the second embodiment in that a teeth row 320 is not formed all along the periphery of the magnet rotor 310, but is formed only on part of the periphery of the magnet rotor 310.

The rotational-linear motion converter 360 may be considered as a compact size of the rotational-linear motion converter 160 of the second embodiment.

The rotational-linear motion converter 360 is realized by incorporating a technical concept of the rotational-linear motion converter 260 of the third embodiment and by applying such a technical concept to the rotational-linear motion converter 160 of the second embodiment.

[Configuration of Rotational-Linear Motion Converter]

The rotational-linear motion converter 360 includes a drive head 330 and a rail 340. The drive head 330 includes a magnet rotor 310 and a teeth row 320. The magnet rotor 310 is concentrically disposed within the drive head 330 so that a gap 315 may be formed between the magnet rotor 310 and a cylindrical internal space of the drive head 330. The teeth row 320 extends like octopus' tentacles (legs) from the internal space of the drive head 330 toward the rail 340 so that a gap 325 may be formed between the teeth row 320 and the rail 340. The drive head 330 and the rail 340 are disposed such that the teeth row 320 of the drive head 330 opposes the rail 340, and the drive head 330 and the rail 340 are relatively movable in the extending direction of the rail 340. The magnet rotor 310 is rotatably supported within the drive head 330.

The magnet rotor 310 includes a magnet row 312 constituted by four sector-shaped permanent magnets 314a through 314d which are magnetized in the radial direction. The permanent magnets 314a and 314c are disposed such that they oppose each other, and are magnetized as the N pole at the inner peripheries thereof and as the S pole at the outer peripheries thereof. The permanent magnets 314b and 314d are disposed such that they oppose each other, and are magnetized as the S pole at the inner peripheries thereof and as the N pole at the outer peripheries thereof. Accordingly, the magnet rotor 310 has four poles, more specifically, the S pole on the upper and lower sides and the N pole on the right and left sides, as viewed from the position of the magnet rotor 310 shown in FIG. 8. The S pole and the N pole are alternately disposed in the peripheral direction of the magnet rotor 310. The configurations of the other parts of the magnet rotor 310 are the same as those of the second embodiment.

In the teeth row 320, teeth 324a and 324b are formed only on part of the periphery of the magnet rotor 310 such that the number of teeth 324a and 324b assigned to the N pole of the magnet rotor 310 and that assigned to the S pole of the magnet rotor 310 are the same. In the fourth embodiment, the teeth 324a and 324b, thirteen being assigned to each pole, are disposed on part of the periphery of the magnet rotor 310 positioned closer to the rail 340 so as to decrease the lengths of the teeth 324a and 324b. As the teeth 324a and 324b are shorter, magnetic resistance within the teeth 324a and 324b also becomes smaller.

The teeth row 320 includes a magnet row 352 having a magnet pitch P and magnetized in the extending direction of the rail 340. The magnet row 352 aligns the magnetic flux which will pass through the teeth row 320. Due to the function of the magnet row 352, the magnetic flux passes through the teeth row 320 in the state in which most of the magnetic lines of force are aligned, thereby reducing a leakage flux. In the magnet row 352, the same polarity (N pole) faces of adjacent permanent magnets 354a oppose each other with a magnetic body 326a therebetween in the extending direction of the rail 340. Moreover, the same polarity (S pole) faces of adjacent permanent magnets 354b oppose each other with a magnetic body 326b therebetween in the extending direction of the rail 340. The configurations of the other parts of the teeth row 320 are the same as those of the second embodiment.

The rail 340 allows a magnetic flux flowing from the magnet row 312 of the magnet rotor 310 to pass through the teeth row 320 toward the rail 340 via the magnetic bodies 326a of the teeth row 320. The rail 340 also allows a magnetic flux to pass through the rail 340 toward the magnet row 312 of the magnet rotor 310 via the magnetic bodies 326a and 326b. In the rail 340, magnetic teeth 342 having a pitch T are formed in the extending direction thereof. The magnetic teeth 342 receive almost all the magnetic lines of force forming a magnetic flux passing through the magnetic bodies 326a of the teeth row 320. The configurations of the other parts of the rail 340 are the same as those of the second embodiment.

[Operation of Rotational-Linear Motion Converter]

A closed magnetic field H formed in the rotational-linear motion converter 360 is not shown. As in the rotational-linear motion converter 160 of the second embodiment, a closed magnetic field H looping in the magnet rotor 310, the teeth row 320, and the rail 340 is formed. In the fourth embodiment, since the teeth row 320 is formed on part of the periphery of the magnet rotor 310 positioned closer to the rail 340, the magnetic flux within the magnet rotor 310 also passes through part of the periphery thereof positioned closer to the rail 340.

The number of magnetic lines of force forming the closed magnetic field H in the rotational-linear motion converter 360 is smaller than that of the rotational-linear motion converter 160 of the second embodiment. However, the teeth 324a and 324b forming the teeth row 320 are shorter, thereby making it possible to reduce the size of the rotational-linear motion converter 360. Thus, a large permissible thrust can be provided with the small rotational-linear motion converter 360.

The principle of the acceleration and reduction of the velocity of the rotational-linear motion converter 360 is the same as that of the rotational-linear motion converter 160 of the second embodiment.

As in the rotational-linear motion converter 160 of the second embodiment, in the rotational-linear motion converter 360, the magnet row 352 magnetized in the extending direction of the rail 340 aligns the magnetic flux which will pass through the teeth row 320. Thus, a leakage flux can be reduced to a minimal level, and a large permissible thrust and a wide-range acceleration reduction velocity ratio can be implemented.

Additionally, in the rotational-linear motion converter 360, a closed magnetic field is formed by using the teeth row 320 only having short teeth 324a and 324b. Accordingly, a large permissible thrust can be provided with the small rotational-linear motion converter 360.

[Fifth Embodiment]

A rotational-linear motion converter 460 according to a fifth embodiment will be described below with reference to a schematic diagram of FIG. 9. The thin black arrows and the thick black arrows in FIG. 9 indicate the rotating directions of a magnet rotor 410 and the moving directions of rails 440a and 440b, respectively.

Figure 9:
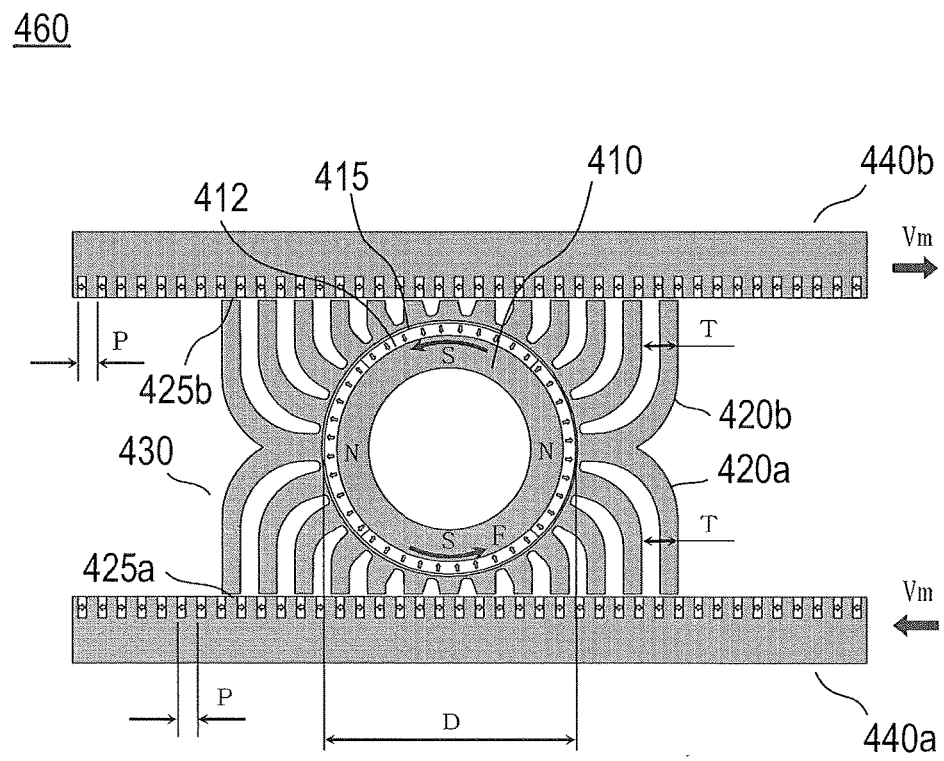
FIG. 9 is a schematic view illustrating a rotational-linear motion converter according to a fifth embodiment.

As shown in FIG. 9, the rotational-linear motion converter 460 may be considered as two rotational-linear motion converters 260 of the third embodiment having the same configuration which use the same magnet rotor 210 and which integrates the two drive heads 230 into a single drive head. Accordingly, in the rotational-linear motion converter 460, the teeth row 420 has a symmetrical arrangement on the upper and lower sides with respect to the magnet rotor 410.

[Configuration of Rotational-Linear Motion Converter]

The rotational-linear motion converter 460 includes a drive head 430 and rails 440a and 440b. The drive head 430 includes a magnet rotor 410 and a teeth row 420. The magnet rotor 410 is concentrically disposed within the drive head 430 so that a gap 415 may be formed between the magnet rotor 410 and a cylindrical internal space of the drive head 430. The teeth row 420 is constituted by two teeth rows 420a and 420b obtained by dividing the teeth row 420 on the upper and lower sides with respect to the magnet rotor 410. The teeth row 420a extends like octopus' tentacles (legs) from the internal space of the drive head 430 toward the rail 440a so that a gap 425a may be formed between the teeth row 420a and the rail 440a. The teeth row 420b extends like octopus' tentacles (legs) from the internal space of the drive head 430 toward the rail 440b so that a gap 425b may be formed between the teeth row 420b and the rail 440b. The rails 440b and 440a are disposed above and below the drive head 430 such that they are in parallel with each other. The drive head 430 and the rail 440a are disposed such that the teeth row 420a of the drive head 430 opposes the rail 440a, and the drive head 430 and the rail 440a are relatively movable in the extending direction of the rail 440a. The drive head 430 and the rail 440b are disposed such that the teeth row 420b of the drive head 430 opposes the rail 440b, and the drive head 430 and the rail 440b are relatively movable in the extending direction of the rail 440b. In the fifth embodiment, the drive head 430 is fixed so that it will not be movable, and the magnet rotor 410 is rotatably supported within the drive head 430.

The configurations of the magnet rotor 410, the teeth rows 420a and 420b, and the rails 440a and 440b are the same as those of the magnet rotor 210, the teeth row 220, and the rail 240, respectively, of the third embodiment.

[Operation of Rotational-Linear Motion Converter]

A closed magnetic field H formed in the rotational-linear motion converter 460 is not shown. In practice, the closed magnetic field H is divided into a closed magnetic field H1 looping within the magnet rotor 410, the teeth row 420a, and the rail 440a and a closed magnetic field H2 looping within the magnet rotor 410, the teeth row 420b, and the rail 440b. The divided closed magnetic fields H1 and H2 are independent of each other, and the mixing of the magnetic flux does not occur. Accordingly, each of the closed magnetic fields H1 and H2 may be considered to be substantially the same as the closed magnetic field formed in the rotational-linear motion converter 260 of the third embodiment. Thus, the principles of the operation of the rotational-linear motion converter 460 and the acceleration and reduction of the velocity of the rotational-linear motion converter 460 are the same as those of the rotational-linear motion converter 260 of the third embodiment.

In the rotational-linear motion converter 460, the relationship between the relative displacement motion of the rail 440a to the drive head 430 and that of the rail 440b to the drive head 430 may be considered to be substantially the same as that obtained when two rotational-linear motion converters 260 of the third embodiment having the same configuration independently perform rotational-linear motion conversion. Accordingly, when the drive head 430 is fixed so that it will not be movable, the relative displacement motion of the rail 440a to the drive head 430 and that of the rail 440b to the drive head 430 have the same velocity and the opposite directions.

As in the rotational-linear motion converter 60 of the first embodiment, in the rotational-linear motion converter 460, magnet rows magnetized in the extending direction of the rails 440a and 440b align the magnetic flux which will pass through the rails 440a and 440b, respectively. Thus, a leakage flux can be reduced to a minimal level, and a large permissible thrust and a wide-range acceleration reduction velocity ratio can be implemented.

Additionally, in the rotational-linear motion converter 460, the drive head 430 has a symmetrical arrangement on the upper and lower sides, and also, the magnet pitch P of the magnet row of the rail 440b and that of the rail 440a above and below the drive head 430 are the same. Accordingly, it is possible to shift the two rails 440a and 440b with respect to the drive head 430 at the same time and at the same velocity in opposite directions. Thus, the rotational-linear motion converter 460 of the fifth embodiment is applicable to, for example, an opening/closing mechanism that is moved to the right and left sides by a certain distance in opposite directions.

[Sixth Embodiment]

A rotational-linear motion converter 560 according to a sixth embodiment will be described below with reference to a schematic diagram of FIG. 10. The thin black arrow and the thick black arrows in FIG. 10 indicate the rotating direction of a magnet rotor 510 and the moving directions of rails 540a and 540b, respectively.

Figure 10:
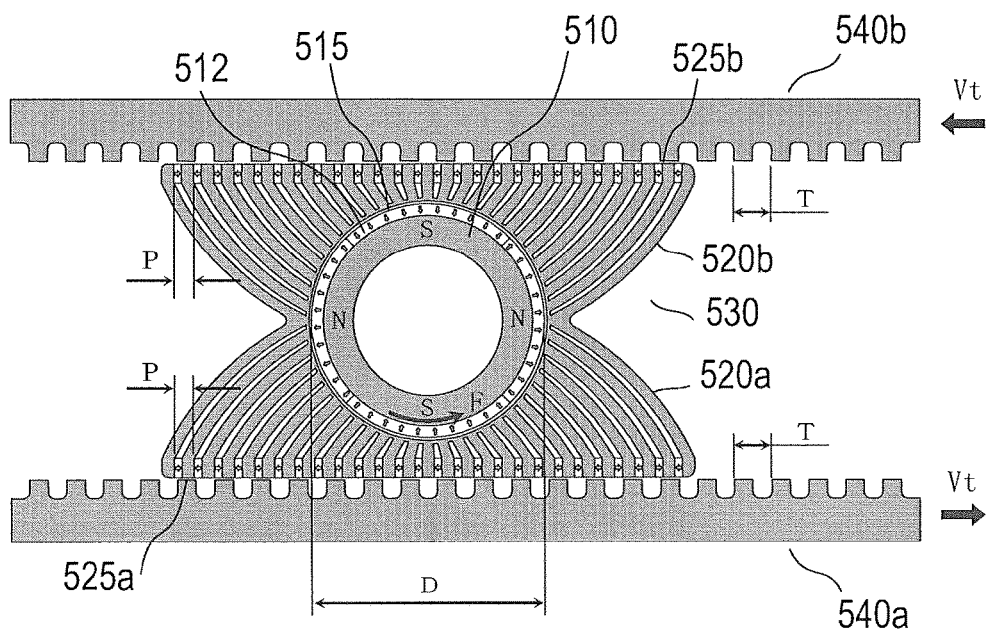
FIG. 10 is a schematic view illustrating a rotational-linear motion converter according to a sixth embodiment.

As shown in FIG. 10, the rotational-linear motion converter 560 may be considered as two rotational-linear motion converters 360 of the fourth embodiment having the same configuration which use the same magnet rotor 310 and which integrates the two drive heads 330 into a single drive head. Accordingly, in the rotational-linear motion converter 560, a teeth row 520 has a symmetrical arrangement on the upper and lower sides with respect to the magnet rotor 510.

The rotational-linear motion converter 560 is realized by incorporating a technical concept of the rotational-linear motion converter 460 of the fifth embodiment and by applying such a technical concept to the rotational-linear motion converter 360 of the fourth embodiment.

[Configuration of Rotational-Linear Motion Converter]

The rotational-linear motion converter 560 includes a drive head 530 and rails 540a and 540b. The drive head 530 includes a magnet rotor 510 and a teeth row 520. The magnet rotor 510 is concentrically disposed within the drive head 530 so that a gap 515 may be formed between the magnet rotor 510 and a cylindrical internal space of the drive head 530. The teeth row 520 is constituted by two teeth rows 520a and 520b obtained by dividing the teeth row 520 horizontally, that is, on the upper and lower sides, with respect to the magnet rotor 510. The teeth row 520a extends like octopus' tentacles (legs) from the internal space of the drive head 530 toward the rail 540a so that a gap 525a may be formed between the teeth row 520a and the rail 540a. The teeth row 520b extends like octopus' tentacles (legs) from the internal space of the drive head 530 toward the rail 540b so that a gap 525b may be formed between the teeth row 520b and the rail 540b. The rails 540b and 540a are disposed above and below the drive head 530 such that they are in parallel with each other. The drive head 530 and the rail 540a are disposed such that the teeth row 520a of the drive head 530 opposes the rail 540a, and the drive head 530 and the rail 540a are relatively movable in the extending direction of the rail 540a. The drive head 530 and the rail 540b are disposed such that the teeth row 520b of the drive head 530 opposes the rail 540b, and the drive head 530 and the rail 540b are relatively movable in the extending direction of the rail 540b. In the sixth embodiment, the drive head 530 is fixed so that it will not be movable, and the magnet rotor 510 is rotatably supported within the drive head 530.

The configurations of the magnet rotor 510, the teeth rows 520a and 520b, and the rails 540a and 540b are the same as those of the magnet rotor 310, the teeth row 320, and the rail 340, respectively, of the fourth embodiment.

[Operation of Rotational-Linear Motion Converter]

A closed magnetic field H formed in the rotational-linear motion converter 560 is not shown. In practice, the closed magnetic field H is divided into a closed magnetic field H1 looping within the magnet rotor 510, the teeth row 520a, and the rail 540a and a closed magnetic field H2 looping within the magnet rotor 510, the teeth row 520b, and the rail 540b. The divided closed magnetic fields H1 and H2 are independent of each other, and the mixing of the magnetic flux does not occur. Accordingly, each of the closed magnetic fields H1 and H2 may be considered to be substantially the same as the closed magnetic field formed in the rotational-linear motion converter 360 of the fourth embodiment. Thus, the principles of the operation of the rotational-linear motion converter 560 and the acceleration and reduction of the velocity of the rotational-linear motion converter 560 are the same as those of the rotational-linear motion converter 360 of the fourth embodiment.

In the rotational-linear motion converter 560, the relationship between the relative displacement motion of the rail 540a to the drive head 530 and that of the rail 540b to the drive head 530 may be considered to be substantially the same as that obtained when two rotational-linear motion converters 360 of the fourth embodiment having the same configuration independently perform rotational-linear motion conversion. Accordingly, when the drive head 530 is fixed so that it will not be movable, the relative displacement motion of the rail 540a to the drive head 530 and that of the rail 540b to the drive head 530 have the same velocity and the opposite directions.

As in the rotational-linear motion converter 160 of the second embodiment, in the rotational-linear motion converter 560, magnet rows magnetized in the extending direction of the rails 540a and 540b align the magnetic flux which will pass through the teeth rows 520a and 520b, respectively. Thus, a leakage flux can be reduced to a minimal level, and a large permissible thrust and a wide-range acceleration reduction velocity ratio can be implemented.

Additionally, in the rotational-linear motion converter 560, the drive head 530 has a symmetrical arrangement on the upper and lower sides, and also, the magnet pitch T of the rail 540b and that of the rail 540a above and below the drive head 530 are the same. Accordingly, it is possible to shift the two rails 540a and 540b with respect to the drive head 530 at the same time and at the same velocity in opposite directions. Thus, the rotational-linear motion converter 560 of the sixth embodiment is applicable to, for example, an opening/closing mechanism that is moved to the right and left sides by a certain distance in opposite directions.

[Seventh Embodiment]

A rotational-linear motion converter 660 according to a seventh embodiment will be described below with reference to a schematic diagram of FIG. 11. The thin black arrows and the thick black arrows in FIG. 11 indicate the rotating directions of a magnet rotor 610 and the moving directions of rails 640a and 640b, respectively.

Figure 11:
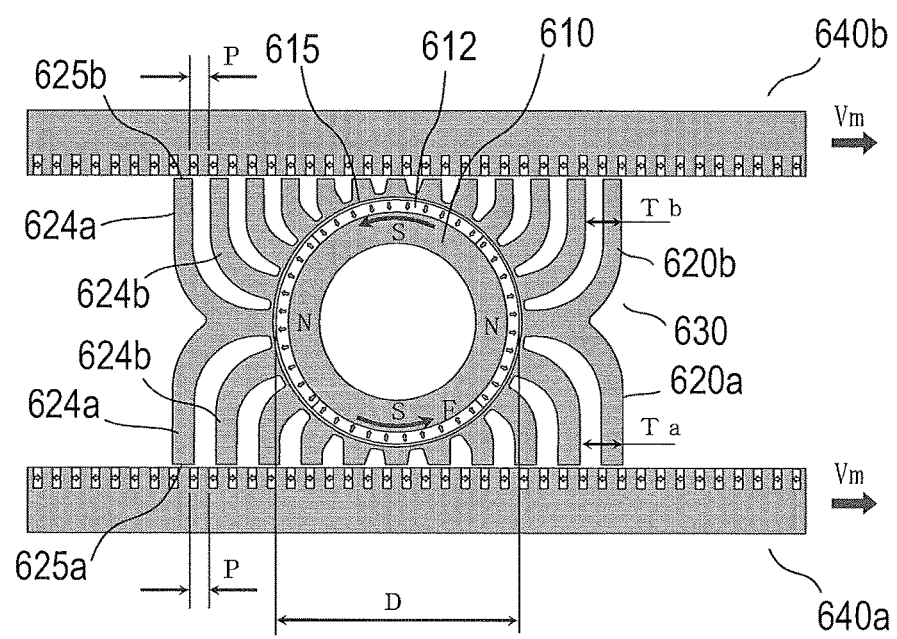
FIG. 11 is a schematic view illustrating a rotational-linear motion converter according to a seventh embodiment.

As shown in FIG. 11, the rotational-linear motion converter 660 may be considered as two rotational-linear motion converters 260 of the third embodiment having different configurations which use the same magnet rotor 210 and which integrates the two drive heads 230 into a single drive head.

The rotational-linear motion converter 660 is different from the rotational-linear motion converter 460 of the fifth embodiment in that a teeth row 620 has an asymmetrical arrangement on the upper and lower sides with respect to the magnet rotor 610.

[Configuration of Rotational-Linear Motion Converter]

The rotational-linear motion converter 660 includes a drive head 630 and rails 640a and 640b. The drive head 630 includes a magnet rotor 610 and a teeth row 620. The magnet rotor 610 is concentrically disposed within the drive head 630 so that a gap 615 may be formed between the magnet rotor 610 and a cylindrical internal space of the drive head 630. The teeth row 620 is constituted by two teeth rows 620a and 620b. The teeth row 620a extends like octopus' tentacles (legs) from the internal space of the drive head 630 toward the rail 640a so that a gap 625a may be formed between the teeth row 620a and the rail 640a. The teeth row 620b extends like octopus' tentacles (legs) from the internal space of the drive head 630 toward the rail 640b so that a gap 625b may be formed between the teeth row 620b and the rail 640b. The rails 640b and 640a are disposed above and below the drive head 630 such that they are in parallel with each other. The drive head 630 and the rail 640a are disposed such that the teeth row 620a of the drive head 630 opposes the rail 640a, and the drive head 630 and the rail 640a are relatively movable in the extending direction of the rail 640a. The drive head 630 and the rail 640b are disposed such that the teeth row 620b of the drive head 630 opposes the rail 640b, and the drive head 630 and the rail 640b are relatively movable in the extending direction of the rail 640b. The magnet rotor 610 is rotatably supported within the drive head 630.

The configurations of the magnet rotor 610 and the rails 640a and 640b are the same as those of the magnet rotor 210 and the rail 240, respectively, of the third embodiment.

The teeth row 620a includes teeth 624a and 624b having different shapes and lengths. The number Mta of teeth 624a and 624b forming the teeth row 620a assigned to each pole of the lower half of the magnet rotor 610 is five. The teeth row 620b includes teeth 624a and 624b having different shapes and lengths. The number Mtb of teeth 624a and 624b forming the teeth row 620b assigned to each pole of the upper half of the magnet rotor 610 is six.

The teeth pitch Ta of the teeth row 620a and the teeth pitch Tb of the teeth row 620b are determined so that they will satisfy the above-described equation (1) and also satisfy the following equation (5):

$$Tb<2\cdot P<Ta(Tb<Ta) \quad (5)$$

where P denotes the magnet pitch of magnet rows 652a and 652b.

In FIG. 11, the number Mta of teeth 624a and 624b forming the teeth row 620a assigned to each pole of the lower half of the magnet rotor 610 is five and the number Mtb of teeth 624a and 624b forming the teeth row 620b assigned to each pole of the upper half of the magnet rotor 610 is six, as discussed above. Accordingly, concerning the teeth row 620a, k is set to be +1 in equation (1), and the teeth pitch Ta is calculated as (P·11/5). Concerning the teeth row 620b, k is set to be −1 in equation (1), and the teeth pitch Tb is calculated as (P·11/6). The configurations of the other parts of the teeth rows 620a and 620b are the same as those of the third embodiment.

[Operation of Rotational-Linear Motion Converter]

A closed magnetic field H formed in the rotational-linear motion converter 660 is not shown. In practice, the closed magnetic field H is divided into a closed magnetic field H1 looping within the magnet rotor 610, the teeth row 620a, and the rail 640a and a closed magnetic field H2 looping within the magnet rotor 610, the teeth row 620b, and the rail 640b. The divided closed magnetic fields H1 and H2 are independent of each other, and the mixing of the magnetic flux does not occur. Accordingly, each of the closed magnetic fields H1 and H2 may be considered to be substantially the same as the closed magnetic field formed in the rotational-linear motion converter 260 of the third embodiment. Thus, the principle of the operation of the rotational-linear motion converter 660 is the same as that of the rotational-linear motion converter 60 of the first embodiment.

In the case of the rotational-linear motion converter 660 of the seventh embodiment, the relationship between the peripheral velocity Vr of the magnet rotor 610 and the motion velocity Vm1 of the rail 640a can be calculated as follows. The number M of poles of the magnet rotor 610 is four, and the coefficient k is +1. Accordingly, by substituting M=4 and k=+1 into equation (2), the following equation is obtained.

$$Vm1/Vr=+4\cdot P/(\pi\cdot D)$$

The relationship between the peripheral velocity Vr of the magnet rotor 610 and the motion velocity Vm2 of the rail 640b can be calculated as follows. The number M of poles of the magnet rotor 610 is four, and the coefficient k is −1. Accordingly, by substituting M=4 and k=−1 into equation (2), the following equation is obtained.

$$Vm2/Vr=-4\cdot P/(\pi\cdot D)$$

Thus, if the drive head 630 is fixed so that it will not be movable, when the magnet rotor 610 is rotated through one revolution, the rail 640a moves by +4·P and the rail 640b moves by −4·P. As viewed from the magnet rotor 610, the rails 640a and 640b move by the same distance in the same direction. Accordingly, the relative displacement motion of the rail 640a to the drive head 630 and that of the rail 640b to the drive head 630 have the same velocity and the same direction.

If the rails 640a and 640b are fixed such that they will not be movable, when the magnet rotor 610 is rotated, the drive head 630 can relatively move between the rails 640a and 640b in one direction. In this case, a magnetic attractive force is canceled between the upper and lower faces of the drive head 630. Accordingly, a load imposed on the rails 640a and 640b during the relative displacement motion of the drive head 630 is reduced, thereby decreasing the occurrence of friction. As a result, higher positioning precision between the rails 640a and 640b and the drive head 630 can be implemented.

As in the rotational-linear motion converter 60 of the first embodiment, in the rotational-linear motion converter 660, magnet rows magnetized in the extending direction of the rails 640a and 640b align the magnetic flux which will pass through the rails 640a and 640b, respectively. Thus, a leakage flux can be reduced to a minimal level, and a large permissible thrust and a wide-range acceleration reduction velocity ratio can be implemented.

Additionally, in the rotational-linear motion converter 660, the teeth pitches Ta and Tb of the teeth rows 620a and 620b are set so that they can satisfy both of the above-described equations (1) and (5), and the magnet pitch P of the two rails 640b and 640a above and below the drive head 630 is the same. Accordingly, it is possible to shift the two rails 640a and 640b relatively to the drive head 630 at the same time and at the same velocity in the same direction. Thus, a magnetic attractive force is canceled between the upper and lower faces of the drive head 630. Accordingly, a load imposed on the rails 640a and 640b during the relative displacement motion to the drive head 630 is reduced, thereby decreasing the occurrence of friction. As a result, higher positioning precision between the rails 640a and 640b and the drive head 630 can be implemented.

[Eighth Embodiment]

A rotational-linear motion converter 760 according to an eighth embodiment will be described below with reference to a schematic diagram of FIG. 12. The thin black arrow and the thick black arrows in FIG. 12 indicate the rotating direction of a magnet rotor 710 and the moving directions of rails 740a and 740b, respectively.

Figure 12:
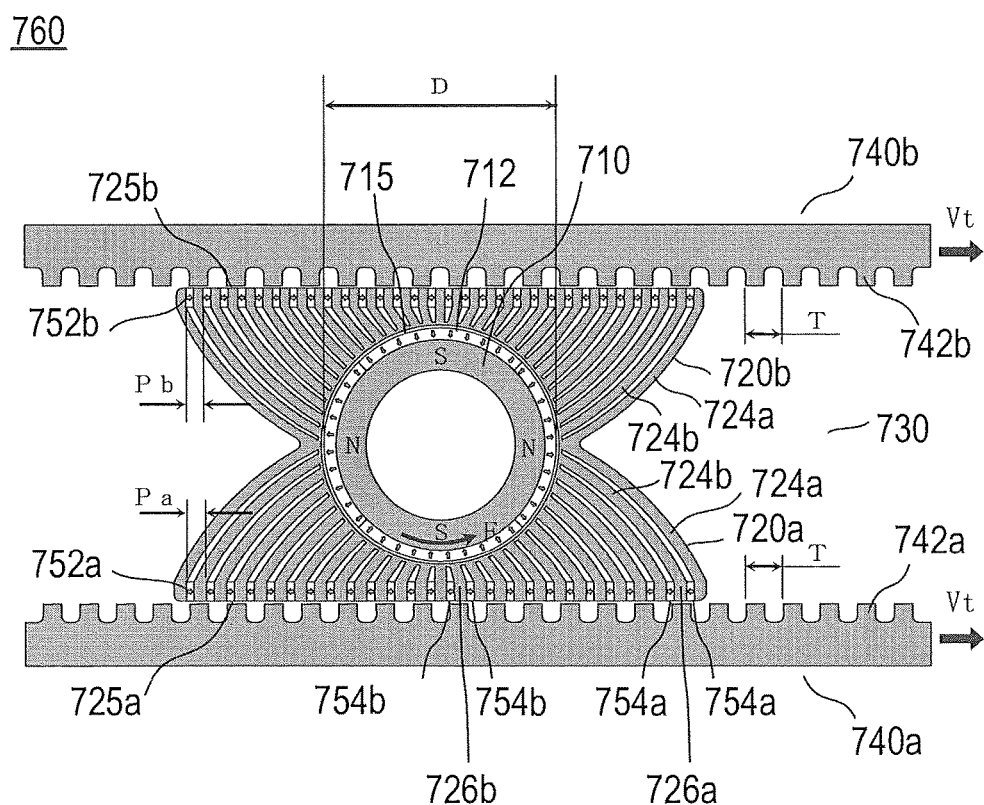
FIG. 12 is a schematic view illustrating a rotational-linear motion converter according to an eighth embodiment.

As shown in FIG. 12, the rotational-linear motion converter 760 may be considered as two rotational-linear motion converters 360 of the fourth embodiment having different configurations which use the same magnet rotor 310 and which integrates the two drive heads 330 into a single drive head.

The rotational-linear motion converter 760 is different from the rotational-linear motion converter 560 of the sixth embodiment in that a teeth row 720 has an asymmetrical arrangement on the upper and lower sides with respect to the magnet rotor 710.

The rotational-linear motion converter 760 is realized by incorporating a technical concept of the rotational-linear motion converter 660 of the seventh embodiment and by applying such a technical concept to the rotational-linear motion converter 360 of the fourth embodiment.

[Configuration of Rotational-Linear Motion Converter]

The rotational-linear motion converter 760 includes a drive head 730 and rails 740a and 740b. The drive head 730 includes a magnet rotor 710 and a teeth row 720. The magnet rotor 710 is concentrically disposed within the drive head 730 so that a gap 715 may be formed between the magnet rotor 710 and a cylindrical internal space of the drive head 730. The teeth row 720 is constituted by two teeth rows 720a and 720b. The teeth row 720a extends like octopus' tentacles (legs) from the internal space of the drive head 730 toward the rail 740a so that a gap 725a may be formed between the teeth row 720a and the rail 740a. The teeth row 720b extends like octopus' tentacles (legs) from the internal space of the drive head 730 toward the rail 740b so that a gap 725b may be formed between the teeth row 720b and the rail 740b.

The rails 740b and 740a are disposed above and below the drive head 730 such that they are in parallel with each other. The drive head 730 and the rail 740a are disposed such that the teeth row 720a of the drive head 730 opposes the rail 740a, and the drive head 730 and the rail 740a are relatively movable in the extending direction of the rail 740a. The drive head 730 and the rail 740b are disposed such that the teeth row 720b of the drive head 730 opposes the rail 740b, and the drive head 730 and the rail 740b are relatively movable in the extending direction of the rail 740b. The magnet rotor 710 is rotatably supported within the drive head 730.

The configuration of the magnet rotor 710 is the same as that of the magnet rotor 310 of the fourth embodiment.

The teeth row 720a includes teeth 724a and 724b having different shapes and lengths. The number Mpa of teeth 724a and 724b forming the teeth row 720a assigned to each pole of the lower half of the magnet rotor 710 is 13. The teeth row 720b includes teeth 724a and 724b having different shapes and lengths. The number Mpb of teeth 724a and 724b forming the teeth row 720b assigned to each pole of the upper half of the magnet rotor 710 is 15.

The teeth row 720a includes a magnet row 752a having a magnet pitch Pa and magnetized in the extending direction of the rail 740a. The teeth row 720b includes a magnet row 752b having a magnet pitch Pb and magnetized in the extending direction of the rail 740b. The magnet rows 752a and 752b align the magnetic flux which will pass through the teeth rows 720a and 720b, respectively. Due to the functions of the magnet rows 752a and 752b, the magnetic flux passes through the teeth rows 720a and 720b in the state in which most of the magnetic lines of force are aligned, thereby reducing a leakage flux. In the magnet rows 752a and 752b, the same polarity (N pole) faces of adjacent permanent magnets 754a oppose each other with a magnetic body 726a therebetween in the extending direction of each of the rails 740a and 740b. Moreover, the same polarity (S pole) faces of adjacent permanent magnets 754b oppose each other with a magnetic body 726b therebetween in the extending direction of each of the rails 740a and 740b. The configurations of the other parts of the teeth rows 720a and 720b are the same as those of the second embodiment.

The rail 740a allows a magnetic flux flowing from the magnet row 712 of the magnet rotor 710 to pass through the teeth row 720a toward the rail 740a via the magnetic bodies 726a of the teeth row 720a. The rail 740a also allows a magnetic flux to pass through the rail 740a toward the magnet row 712 of the magnet rotor 710 via the magnetic bodies 726a and 726b. In the rail 740a, magnetic teeth 742a having a pitch T are formed in the extending direction thereof. The magnetic teeth 742a receive almost all the magnetic lines of force forming a magnetic flux passing through the magnetic bodies 726a of the teeth row 720a.

The rail 740b allows a magnetic flux flowing from the magnet row 712 of the magnet rotor 710 to pass through the teeth row 720b toward the rail 740b via the magnetic bodies 726a of the teeth row 720b. The rail 740b also allows a magnetic flux to pass through the rail 740b toward the magnet row 712 of the magnet rotor 710 via the magnetic bodies 726a and 726b. In the rail 740b, magnetic teeth 742b having a pitch T are formed in the extending direction thereof. The magnetic teeth 742b receive almost all the magnetic lines of force forming a magnetic flux passing through the magnetic bodies 726a of the teeth row 720b.

The teeth pitch T of the magnetic teeth 742a and 742b provided in the rails 740a and 740b, respectively, are determined so that it will satisfy the above-described equation (3) and also satisfy the following equation (6):

$$2 \cdot Pb < T < 2 \cdot Pa \quad (6)$$

where Pb and Pa denote the magnet pitches of magnet rows 752b and 752a, respectively.

In FIG. 12, the number Mpa of teeth 724a and 724b forming the teeth row 720a assigned to each pole of the lower half of the magnet rotor 710 is 13 and the number Mpb of teeth 724a and 724b forming the teeth row 720b assigned to each pole of the upper half of the magnet rotor 710 is 15, as discussed above. Accordingly, concerning the teeth row 720a, k is set to be −1 in equation (3), and the relationship between the teeth pitch T of the magnetic teeth 742a and the magnet pitch Pa of the magnet row 752a is calculated as T=Pa·24/13. Concerning the teeth row 720b, k is set to be +1 in equation (3), and the relationship between the teeth pitch T of the magnetic teeth 742b and the magnet pitch Pb of the magnet row 752b is calculated as T=Pb·32/15. The configurations of the other parts of the rails 740*a* and 740*b* are the same as those of the second embodiment.

[Operation of Rotational-Linear Motion Converter]

A closed magnetic field H formed in the rotational-linear motion converter 760 is not shown. In practice, the closed magnetic field H is divided into a closed magnetic field H1 looping within the magnet rotor 710, the teeth row 720*a*, and the rail 740*a* and a closed magnetic field H2 looping within the magnet rotor 710, the teeth row 720*b*, and the rail 740*b*. The divided closed magnetic fields H1 and H2 are independent of each other, and the mixing of the magnetic flux does not occur. Accordingly, each of the closed magnetic fields H1 and H2 may be considered to be substantially the same as the closed magnetic field formed in the rotational-linear motion converter 360 of the fourth embodiment. Thus, the principle of the operation of the rotational-linear motion converter 760 is the same as that of the rotational-linear motion converter 160 of the second embodiment.

In the case of the rotational-linear motion converter 760 of the eighth embodiment, the relationship between the peripheral velocity Vr of the magnet rotor 710 and the motion velocity Vt1 of the rail 740*a* can be calculated as follows. The number M of poles of the magnet rotor 710 is four, and the coefficient k is −1. Accordingly, by substituting M=4 and k=−1 into equation (4), the following equation is obtained.

$$Vt1/Vr = +2 \cdot T/(\pi \cdot D)$$

The relationship between the peripheral velocity Vr of the magnet rotor 710 and the motion velocity Vt2 of the rail 740*b* can be calculated as follows. The number M of poles of the magnet rotor 710 is four, and the coefficient k is +1. Accordingly, by substituting M=4 and k=+1 into equation (4), the following equation is obtained.

$$Vt2/Vr = -2 \cdot T/(\pi \cdot D)$$

Thus, if the drive head 730 is fixed so that it will not be movable, when the magnet rotor 710 is rotated through one revolution, the rail 740*a* moves by +2·T and the rail 740*b* moves by −2·T. As viewed from the magnet rotor 710, the rails 740*a* and 740*b* move by the same distance in the same direction. Accordingly, the relative displacement motion of the rail 740*a* to the drive head 730 and that of the rail 740*b* to the drive head 730 have the same velocity and the same direction.

If the rails 740*a* and 740*b* are fixed such that they will not be movable, when the magnet rotor 710 is rotated, the drive head 730 can relatively move between the rails 740*a* and 740*b* in one direction. In this case, a magnetic attractive force is canceled between the upper and lower faces of the drive head 730. Accordingly, a load imposed on the rails 740*a* and 740*b* during the relative displacement motion of the drive head 730 is reduced, thereby decreasing the occurrence of friction. As a result, higher positioning precision between the rails 740*a* and 740*b* and the drive head 730 can be implemented.

As in the rotational-linear motion converter 160 of the second embodiment, in the rotational-linear motion converter 760, the magnet rows 752*a* and 752*b* magnetized in the extending direction of the rails 740*a* and 740*b*, respectively, align the magnetic flux which will pass through the teeth rows 720*a* and 720*b*, respectively. Thus, a leakage flux can be reduced to a minimal level, and a large permissible thrust and a wide-range acceleration reduction velocity ratio can be implemented.

Additionally, in the rotational-linear motion converter 760, the teeth pitches of the teeth rows 720*a* and 720*b* are set so that they can satisfy both of the above-described equations (3) and (6), and the magnet pitch T of the magnetic teeth 742*b* and 742*a* provided in the two rails 740*b* and 740*a*, respectively, above and below the drive head 730 is the same. Accordingly, it is possible to shift the two rails 740*a* and 740*b* relatively to the drive head 730 at the same time and at the same velocity in the same direction. Thus, a magnetic attractive force is canceled between the upper and lower faces of the drive head 730. Accordingly, a load imposed on the rails 740*a* and 740*b* during the relative displacement motion to the drive head 730 is reduced, thereby decreasing the occurrence of friction. As a result, higher positioning precision between the rails 740*a* and 740*b* and the drive head 730 can be implemented.

A description will now be given, with reference to FIGS. 13 through 17, of a change in the closed magnetic field H in accordance with the rotation position of the magnet rotor 710. As shown in FIGS. 13 through 17, as the magnet rotor 710 is rotated counterclockwise starting from the position shown in FIG. 13 from 0° to 180° by 45°, the arrangement of the closed magnetic field H and the flowing direction of the magnetic flux are different in accordance with the rotation position of the magnet rotor 710. In FIGS. 13 through 17, a mark Y is shown only for the purpose of indicating a current rotation position of the magnet rotor 710, and a reference line I-I is also shown only for the purpose of indicating relative displacement of the rails 740*a* and 740*b*.

Figure 13:
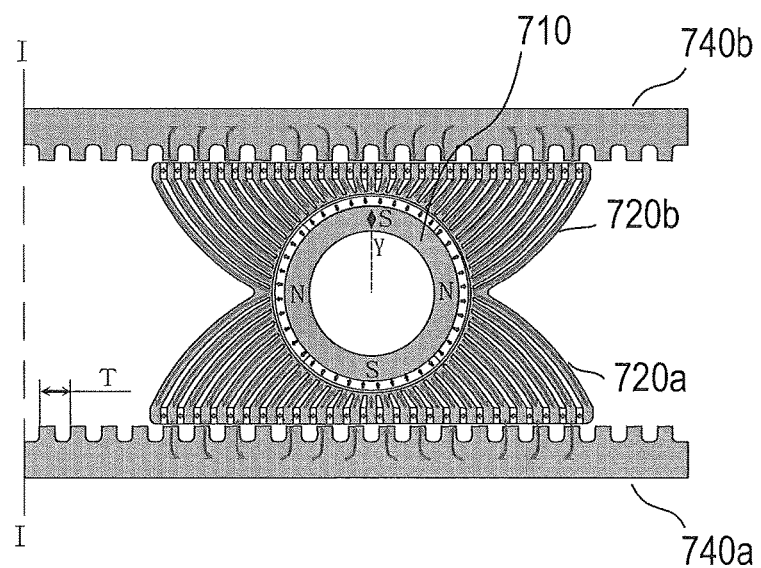
FIG. 13 illustrates a closed magnetic field formed when a magnet rotor shown in FIG. 12 is positioned at 0°.

FIG. 13 illustrates a closed magnetic field formed when the magnet rotor 710 is positioned at 0°. As viewed from the position of the magnet rotor 710 shown in FIG. 13, the top and bottom sides of the magnet rotor 710 are magnetized as the S pole, while the right and left sides of the magnet rotor 710 are magnetized as the N pole. Accordingly, in the closed magnetic field H1 looping within the magnet rotor 710, the teeth row 720*a*, and the rail 740*a* and in the closed magnetic field H2 looping within the magnet rotor 710, the teeth row 720*b*, and the rail 740*b*, the magnetic flux flows in the following manner.

The magnetic flux of the closed magnetic field H1 flows from the N pole of the magnet rotor 710 to the receiving areas of the rail 740*a* via the teeth 724*a* and 724*b* positioned at both sides of the teeth row 720*a* in FIG. 13. The magnetic flux of the closed magnetic field H1 also flows back from the transfer area B of the rail 740*a* to the S pole of the magnet rotor 710 via the teeth 724*a* and 724*b* positioned at the central portion of the teeth row 720*a* in FIG. 13.

The magnetic flux of the closed magnetic field H2 flows from the N pole of the magnet rotor 710 to the receiving areas of the rail 740*b* via the teeth 724*a* and 724*b* positioned at both sides of the teeth row 720*b* in FIG. 13. The magnetic flux of the closed magnetic field H2 also flows back from the transfer area B of the rail 740*b* to the S pole of the magnet rotor 710 via the teeth 724*a* and 724*b* positioned at the central portion of the teeth row 720*b* in FIG. 13.

Figure 14:
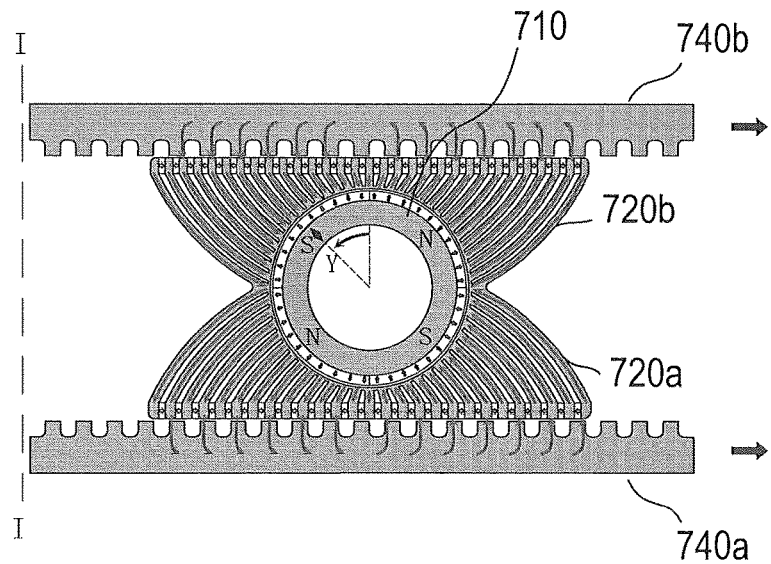
FIG. 14 illustrates a closed magnetic field formed when the magnet rotor shown in FIG. 12 is positioned at 45°.

FIG. 14 illustrates a closed magnetic field formed when the magnet rotor 710 is positioned at 45°. As viewed from the position of the magnet rotor 710 shown in FIG. 14, the top left and bottom right sides of the magnet rotor 710 are magnetized as the S pole, while the bottom left and top right sides of the magnet rotor 710 are magnetized as the N pole. Accordingly, in the closed magnetic field H1 looping within the magnet rotor 710, the teeth row 720*a*, and the rail 740*a* and in the closed magnetic field H2 looping within the magnet rotor 710, the teeth row 720*b*, and the rail 740*b*, the magnetic flux flows in the following manner.

The magnetic flux of the closed magnetic field H1 flows from the N pole of the magnet rotor 710 to the receiving area of the rail 740*a* via the teeth 724*a* and 724*b* positioned at the left half side of the teeth row 720*a* in FIG. 14. The magnetic flux of the closed magnetic field H1 also flows back from the transfer area B of the rail 740*a* to the S pole of the magnet rotor 710 via the teeth 724*a* and 724*b* positioned at the right half side of the teeth row 720*a* in FIG. 14.

The magnetic flux of the closed magnetic field H2 flows from the N pole of the magnet rotor 710 to the receiving area of the rail 740*b* via the teeth 724*a* and 724*b* positioned at the right half side of the teeth row 720*b* in FIG. 14. The magnetic flux of the closed magnetic field H2 also flows back from the transfer area B of the rail 740*b* to the S pole of the magnet rotor 710 via the teeth 724*a* and 724*b* positioned at the left half side of the teeth row 720*b* in FIG. 14.

When the drive head 730 is fixed so that it will not be movable, from equation (4), it is seen that the rails 740*a* and 740*b* move to the right side of FIG. 14 by T/4 with respect to the reference line I-I.

Figure 15:
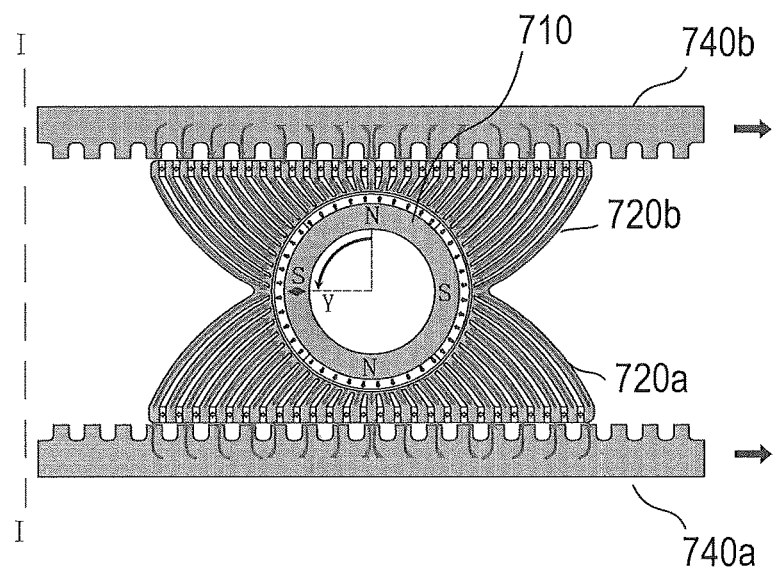
FIG. 15 illustrates a closed magnetic field formed when the magnet rotor shown in FIG. 12 is positioned at 90°.

FIG. 15 illustrates a closed magnetic field formed when the magnet rotor 710 is positioned at 90°. As viewed from the position of the magnet rotor 710 shown in FIG. 15, the right and left sides of the magnet rotor 710 are magnetized as the S pole, while the top and bottom sides of the magnet rotor 710 are magnetized as the N pole. Accordingly, in the closed magnetic field H1 looping within the magnet rotor 710, the teeth row 720*a*, and the rail 740*a* and in the closed magnetic field H2 looping within the magnet rotor 710, the teeth row 720*b*, and the rail 740*b*, the magnetic flux flows in the following manner.

The magnetic flux of the closed magnetic field H1 flows from the N pole of the magnet rotor 710 to the receiving area of the rail 740*a* via the teeth 724*a* and 724*b* positioned at the central portion of the teeth row 720*a* in FIG. 15. The magnetic flux of the closed magnetic field H1 also flows back from the transfer areas B of the rail 740*a* to the S pole of the magnet rotor 710 via the teeth 724*a* and 724*b* positioned at both sides of the teeth row 720*a* in FIG. 15.

The magnetic flux of the closed magnetic field H2 flows from the N pole of the magnet rotor 710 to the receiving area of the rail 740*b* via the teeth 724*a* and 724*b* positioned at the central portion of the teeth row 720*b* in FIG. 15. The magnetic flux of the closed magnetic field H2 also flows back from the transfer areas B of the rail 740*b* to the S pole of the magnet rotor 710 via the teeth 724*a* and 724*b* positioned at both sides of the teeth row 720*b* in FIG. 15.

When the drive head 730 is fixed so that it will not be movable, from equation (4), it is seen that the rails 740*a* and 740*b* move to the right side of FIG. 15 by T/2 with respect to the reference line I-I.

Figure 16:
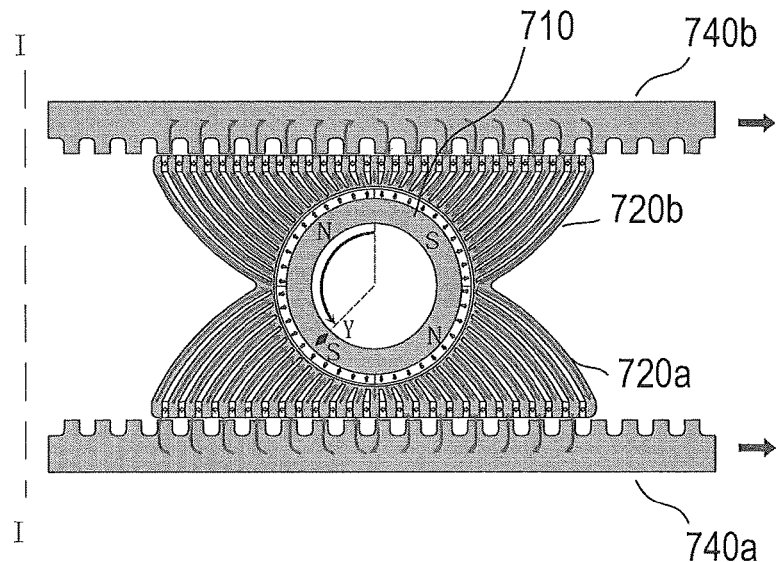
FIG. 16 illustrates a closed magnetic field formed when the magnet rotor shown in FIG. 12 is positioned at 135°.

FIG. 16 illustrates a closed magnetic field formed when the magnet rotor 710 is positioned at 135°. As viewed from the position of the magnet rotor 710 shown in FIG. 16, the bottom left and top right sides of the magnet rotor 710 are magnetized as the S pole, while the top left and bottom right sides of the magnet rotor 710 are magnetized as the N pole. Accordingly, in the closed magnetic field H1 looping within the magnet rotor 710, the teeth row 720*a*, and the rail 740*a* and in the closed magnetic field H2 looping within the magnet rotor 710, the teeth row 720*b*, and the rail 740*b*, the magnetic flux flows in the following manner.

The magnetic flux of the closed magnetic field H1 flows from the N pole of the magnet rotor 710 to the receiving area of the rail 740*a* via the teeth 724*a* and 724*b* positioned at the right half side of the teeth row 720*a* in FIG. 16. The magnetic flux of the closed magnetic field H1 also flows back from the transfer area B of the rail 740*a* to the S pole of the magnet rotor 710 via the teeth 724*a* and 724*b* positioned at the left half side of the teeth row 720*a* in FIG. 16.

The magnetic flux of the closed magnetic field H2 flows from the N pole of the magnet rotor 710 to the receiving area of the rail 740*b* via the teeth 724*a* and 724*b* positioned at the left half side of the teeth row 720*b* in FIG. 16. The magnetic flux of the closed magnetic field H2 also flows back from the transfer area B of the rail 740*b* to the S pole of the magnet rotor 710 via the teeth 724*a* and 724*b* positioned at the right half side of the teeth row 720*b* in FIG. 16.

When the drive head 730 is fixed so that it will not be movable, from equation (4), it is seen that the rails 740*a* and 740*b* move to the right side of FIG. 16 by 3·T/4 with respect to the reference line I-I.

Figure 17:
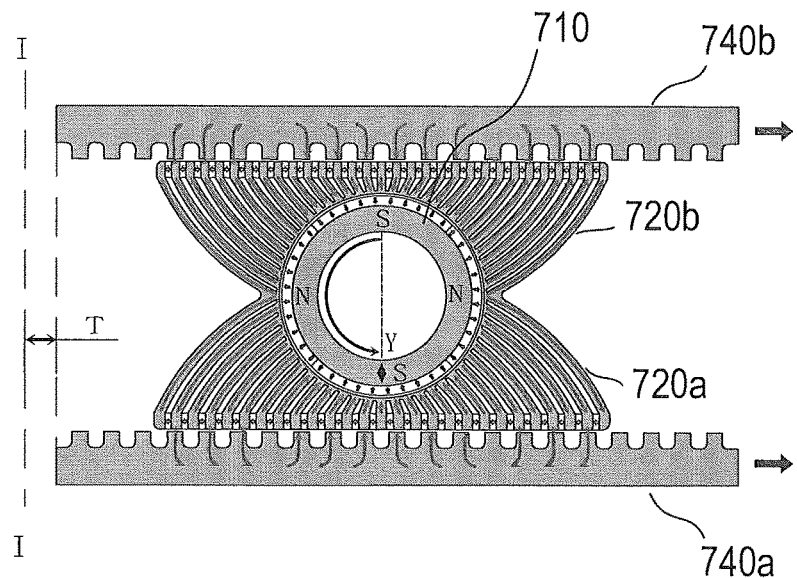
FIG. 17 illustrates a closed magnetic field formed when the magnet rotor shown in FIG. 12 is positioned at 180°.

FIG. 17 illustrates a closed magnetic field formed when the magnet rotor 710 is positioned at 180°. As viewed from the position of the magnet rotor 710 shown in FIG. 17, the top and bottom sides of the magnet rotor 710 are magnetized as the S pole, while the right and left sides of the magnet rotor 710 are magnetized as the N pole. Accordingly, in the closed magnetic field H1 looping within the magnet rotor 710, the teeth row 720*a*, and the rail 740*a* and in the closed magnetic field H2 looping within the magnet rotor 710, the teeth row 720*b*, and the rail 740*b*, the magnetic flux flows in the following manner.

The magnetic flux of the closed magnetic field H1 flows from the N pole of the magnet rotor 710 to the receiving areas of the rail 740*a* via the teeth 724*a* and 724*b* positioned at both sides of the teeth row 720*a* in FIG. 17. The magnetic flux of the closed magnetic field H1 also flows back from the transfer area B of the rail 740*a* to the S pole of the magnet rotor 710 via the teeth 724*a* and 724*b* positioned at the central portion of the teeth row 720*a* in FIG. 17.

The magnetic flux of the closed magnetic field H2 flows from the N pole of the magnet rotor 710 to the receiving areas of the rail 740*b* via the teeth 724*a* and 724*b* positioned at both sides of the teeth row 720*b* in FIG. 17. The magnetic flux of the closed magnetic field H2 also flows back from the transfer area B of the rail 740*b* to the S pole of the magnet rotor 710 via the teeth 724*a* and 724*b* positioned at central portion of the teeth row 720*b* in FIG. 17.

When the drive head 730 is fixed so that it will not be movable, from equation (4), it is seen that the rails 740*a* and 740*b* move to the right side of FIG. 17 by T with respect to the reference line I-I.

[Examples of Applications of Rotational-Linear Motion Converter to Motion Power Transmission Device]

An example of applications of rotational-linear motion converters having the above-described configurations will be discussed below briefly.

Figure 18:
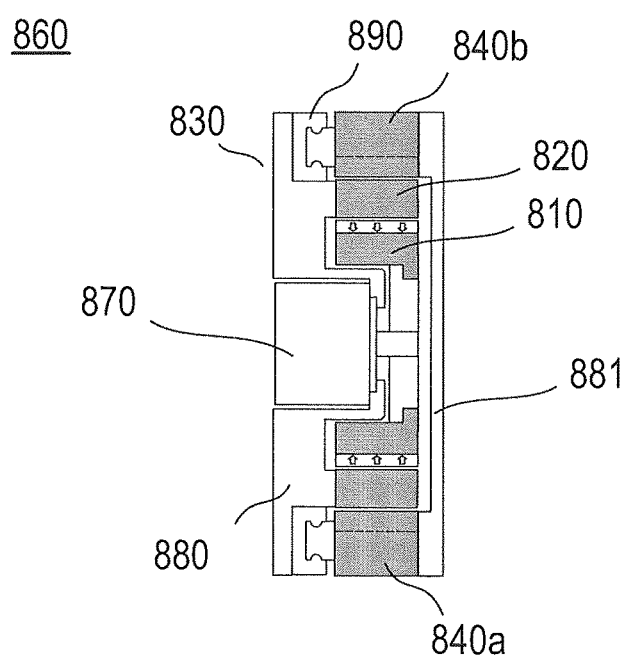
FIG. 18 illustrates an example of applications of a rotational-linear motion converter according to an embodiment of the present invention.

FIG. 18 illustrates an example of applications of a rotational-linear motion converter 860 having a configuration of, for example, the eighth embodiment.

As shown in FIG. 18, the rotational-linear motion converter 860 includes a power input/output unit 870 which contains a magnet rotor 810 to be connected to a power generator, such as a motor, or an electrical generator Ge.

The magnet rotor 810, a teeth row 820, and the power input/output unit 870 are coupled to each other by a coupling component 880 so as to form a drive head 830. Two slide blocks 890 are fixed to the coupling component 880, and more specifically, one slide block is fixed to one side of the coupling component 880 and the other slide block is fixed to the other side of the coupling component 880, and the heads of slide rails are embedded in the respective slide blocks 890.

Rails 840*a* and 840*b* of the rotational-linear motion converter 860 are slidably connected to the heads of the respective slide rails. In this example, the rails 840*a* and 840*b* are coupled to each other by a coupling component 881 so that the rails 840*a* and 840*b* can be moved only in one direction. If it is not necessary to move the rails 840*a* and 840*b* in the same direction, the provision of the coupling component 881 may be eliminated.

In the rotational-linear motion converter 860, when the power input/output unit 870 receives power from an external power generator, such as a motor, rotational motion of the magnet rotor 810 to be rotated by the motor can be converted into linear motion of the drive head 830 or the rails 840*a* and 840*b*. When the power input/output unit 870 outputs power to, for example, an external electrical generator Ge, linear motion of the drive head 830 or the rails 840*a* and 840*b* can be converted into rotational motion of the magnet rotor 810.

As discussed above, by the use of the coupling component 880, the slide blocks 890, the slide rails, and so on, the rotational-linear motion converter 860 is fixed to a motor or an electrical generator Ge, and is used.

What is claimed is:

1. A rotational-linear motion converter comprising:
   a magnet rotor that is formed in a cylindrical shape and that includes a first magnet row magnetized in a radial direction of the magnet rotor;
   a rail that is formed in a linear shape and that includes a plurality of projecting portions and recessed portions;
   a teeth row that includes teeth and allows a magnetic flux flowing from the first magnet row of the magnet rotor to pass between the magnet rotor and the rail; and
   a second magnet row that includes magnets and that is magnetized in an extending direction of the rail in order to align the magnetic flux flowing from the first magnet row of the magnet rotor toward the projecting portions and the recessed portions of the rail,
   wherein, in the second magnet row magnetized in the extending direction of the rail, the same polarity faces of adjacent magnets oppose each other in the extending direction of the rail;
   wherein the projecting portions of the rail are magnetic bodies, and
   wherein distal ends of the teeth of one side of the teeth row are interconnected to each other in a peripheral direction of the magnet rotor so as to form a cylindrical internal space in which the magnet rotor is stored, and the other side of the teeth row branches off to form the teeth having a certain pitch such that forward ends of the teeth oppose the projecting portions and the recessed portions of the rail.

2. The rotational-linear motion converter according to claim 1, wherein the magnets of the second magnet row magnetized in the extending direction of the rail are stored within the recessed portions of the rail.

3. The rotational-linear motion converter according to claim 1, wherein the distal ends of the teeth interconnected to each other are formed to be thin in the radial direction of the magnet rotor so that a leakage of the magnetic flux between adjacent teeth will not occur.

4. The rotational-linear motion converter according to claim 1, wherein the magnets of the second magnet row magnetized in the extending direction of the rail are stored between the forward ends of the teeth branched off from the teeth row.

5. The rotational-linear motion converter according to claim 1, wherein a plurality of the rails are provided in a direction parallel to each other or intersecting with each other with respect to the magnet rotor.

6. The rotational-linear motion converter according to claim 1, wherein the magnet rotor is rotatably supported within the cylindrical internal space formed by the distal ends of the teeth of the teeth row.

7. The rotational-linear motion converter according to claim 1, wherein the forward ends of the teeth branched off from the teeth row have a certain gap between the forward ends of the teeth and the projecting portions and the recessed portions of the rail.

8. The rotational-linear motion converter according to claim 1, wherein the rail is supported so as to be reciprocatable in the extending direction of the rail.

9. A rotational-linear motion converter comprising:
   a magnet rotor having N poles, N being an even number;
   a drive head that includes a teeth row having teeth disposed on a peripheral portion of the magnet rotor with a certain gap such that the teeth row opposes at least two poles of the magnet rotor; and
   a rail that is movable in a direction perpendicular to a rotational axis of the magnet rotor and that contains a magnet row, wherein
   the rail opposes the teeth row with a certain gap in a plane parallel with the rotational axis of the magnet rotor, and
   the drive head and the rail perform relative displacement m;
   wherein, when N is the number of poles of the magnet rotor, Mt is the number of teeth assigned to each pole of the magnet rotor, P is a pitch of the magnet row of the rail, D is a diameter of the magnet rotor, F is a rotational velocity of the magnet rotor, Vr is a peripheral velocity of the magnet rotor, Vm is a motion velocity of the rail, and T is a pitch of the teeth of the teeth row, the pitch of the teeth of the teeth row is expressed by:

$$T=(2 \cdot P)+k \cdot (P/Mt)$$

where k is +1 or −1, and a reduction velocity ratio of the motion velocity of the rail to the peripheral velocity of the magnet rotor is expressed by:

$$Vm/Vr=(\cdot N \cdot P)/(\pi D)$$

where k is +1 or −1.

10. The rotational-linear motion converter according to claim 9, wherein the rail is disposed on each side of the magnet rotor.

11. A rotational-linear motion converter comprising:
   a magnet rotor having N poles, N being an even number;
   a drive head that includes a teeth row having teeth disposed on a peripheral portion of the magnet rotor with a certain gap such that the teeth row opposes at least two poles of the magnet rotor; and
   a rail that is movable in a direction perpendicular to a rotational axis of the magnet rotor and that contains a magnet row, wherein
   the rail opposes the teeth row with a certain gap in a plane parallel with the rotational axis of the magnet rotor, and
   the drive head and the rail perform relative displacement m;
   wherein
   the pitch of the magnet row of one of two rails disposed on one side of the magnet rotor and the pitch of the magnet row of the other one of the two rails disposed on the other side of the magnet rotor are equally P, and when the pitch of the teeth of a teeth row opposing one of the two rails is Ta and the pitch of the teeth of a teeth row opposing the other one of the two rails is Tb and when Ta is assumed to be greater than Tb, relationships among Ta, Tb, and P are expressed by:

$$Tb < 2 \cdot P < Ta.$$

12. A rotational-linear motion converter comprising:
a magnet rotor having N poles, N being an even number;
a drive head that includes a teeth row having a magnet row and teeth disposed on a peripheral portion of the magnet rotor with a certain gap such that the teeth row opposes at least two poles of the magnet rotor; and
a rail that is movable in a direction perpendicular to a rotational axis of the magnet rotor, wherein
the rail opposes the teeth row with a certain gap in a plane parallel with the rotational axis of the magnet rotor, and
the drive head and the rail perform relative displacement motion.

13. The rotational-linear motion converter according to claim 12, wherein, when N is the number of poles of the magnet rotor, Mp is the number of teeth assigned to each pole of the magnet rotor, P is a pitch of the magnet row of the teeth row, D is a diameter of the magnet rotor, F is a rotational velocity of the magnet rotor, Vr is a peripheral velocity of the magnet rotor, Vt is a motion velocity of the rail, and T is a pitch of the teeth of the teeth row, the pitch of the teeth of the teeth row is expressed by:

$$T = (2 \cdot P) + k \cdot (2 \cdot P / Mp)$$

where k is +1 or −1, and
a reduction velocity ratio of the motion velocity of the rail to the peripheral velocity of the magnet rotor is expressed by:

$$Vt/Vr = (-k \cdot N \cdot T/2)/(\pi \cdot D)$$

where k is +1 or −1.

14. The rotational-linear motion converter according to claim 12, wherein the rail is disposed on each side of the magnet rotor.

15. The rotational-linear motion converter according to claim 14, wherein
a teeth pitch of one of two rails disposed on one side of the magnet rotor and a teeth pitch of the other one of the two rails disposed on the other side of the magnet rotor are equally T, and
when the pitch of the teeth of a teeth row opposing one of the two rails is Pa and the pitch of the teeth of a teeth row opposing the other one of the two rails is Pb and when Pa is assumed to be greater than Pb, relationships among Pa, Pb, and T are expressed by:

$$2 \cdot Pb < T < 2 \cdot Pa.$$

* * * * *